(12) United States Patent
Watanabe

(10) Patent No.: US 7,948,543 B2
(45) Date of Patent: May 24, 2011

(54) IMAGING APPARATUS PROVIDED WITH IMAGE SCALING FUNCTION AND IMAGE DATA THINNING-OUT READOUT FUNCTION

(75) Inventor: Nobuyuki Watanabe, Yokohama (JP)

(73) Assignee: Olympus Corporation, Tokyo (JP)

( * ) Notice: Subject to any disclaimer, the term of this patent is extended or adjusted under 35 U.S.C. 154(b) by 742 days.

(21) Appl. No.: 11/745,302

(22) Filed: May 7, 2007

(65) Prior Publication Data

US 2007/0206207 A1 Sep. 6, 2007

Related U.S. Application Data

(63) Continuation of application No. 11/366,734, filed on Mar. 2, 2006, now abandoned, which is a continuation of application No. PCT/JP2004/012636, filed on Sep. 1, 2004.

(30) Foreign Application Priority Data

Sep. 4, 2003 (JP) .................................. 2003-312722

(51) Int. Cl.
　　*H04N 3/14* (2006.01)
　　*H04N 5/335* (2006.01)
　　*H04N 5/228* (2006.01)
　　*G06K 9/32* (2006.01)
(52) U.S. Cl. ..................... 348/305; 348/222.1; 382/299; 382/300
(58) Field of Classification Search .................... 348/305
See application file for complete search history.

(56) References Cited

U.S. PATENT DOCUMENTS

| 5,852,468 | A | | 12/1998 | Okada | |
|---|---|---|---|---|---|
| 5,982,984 | A | * | 11/1999 | Inuiya | ............................ 386/121 |
| 6,654,492 | B1 | | 11/2003 | Sasai | |
| 7,224,494 | B2 | | 5/2007 | Saitou et al. | |
| 2002/0044778 | A1 | | 4/2002 | Suzuki | |
| 2003/0169355 | A1 | | 9/2003 | Kubo | |
| 2003/0202697 | A1 | * | 10/2003 | Simard et al. | .................. 382/195 |

FOREIGN PATENT DOCUMENTS

| JP | 2001-16441 A | 1/2001 |
|---|---|---|
| JP | 2001-86522 A | 3/2001 |
| JP | 2001-245141 A | 9/2001 |
| JP | 2002-84547 A | 3/2002 |

* cited by examiner

*Primary Examiner* — Lin Ye
*Assistant Examiner* — Chia-Wei A Chen
(74) *Attorney, Agent, or Firm* — Holtz, Holtz, Goodman & Chick, PC

(57) ABSTRACT

An imaging apparatus includes an imaging element which photoelectrically converts an image formed by an optical system, the imaging element being equipped with a color filter array (CFA) with different spectral transmittances. The apparatus includes a full color data generator which samples photoelectrically converted signals by the imaging element to obtain image signals having luminance information of each color of the CFA and sampling position information, and, when transforming a pattern of the pixel signals into full color data, generates full color data by obtaining weighting coefficients for generation of each color component of the full color data on the basis of a relative relationship between positions of a lattice pattern of the full color data to be generated and position information of the pixel signals.

10 Claims, 19 Drawing Sheets

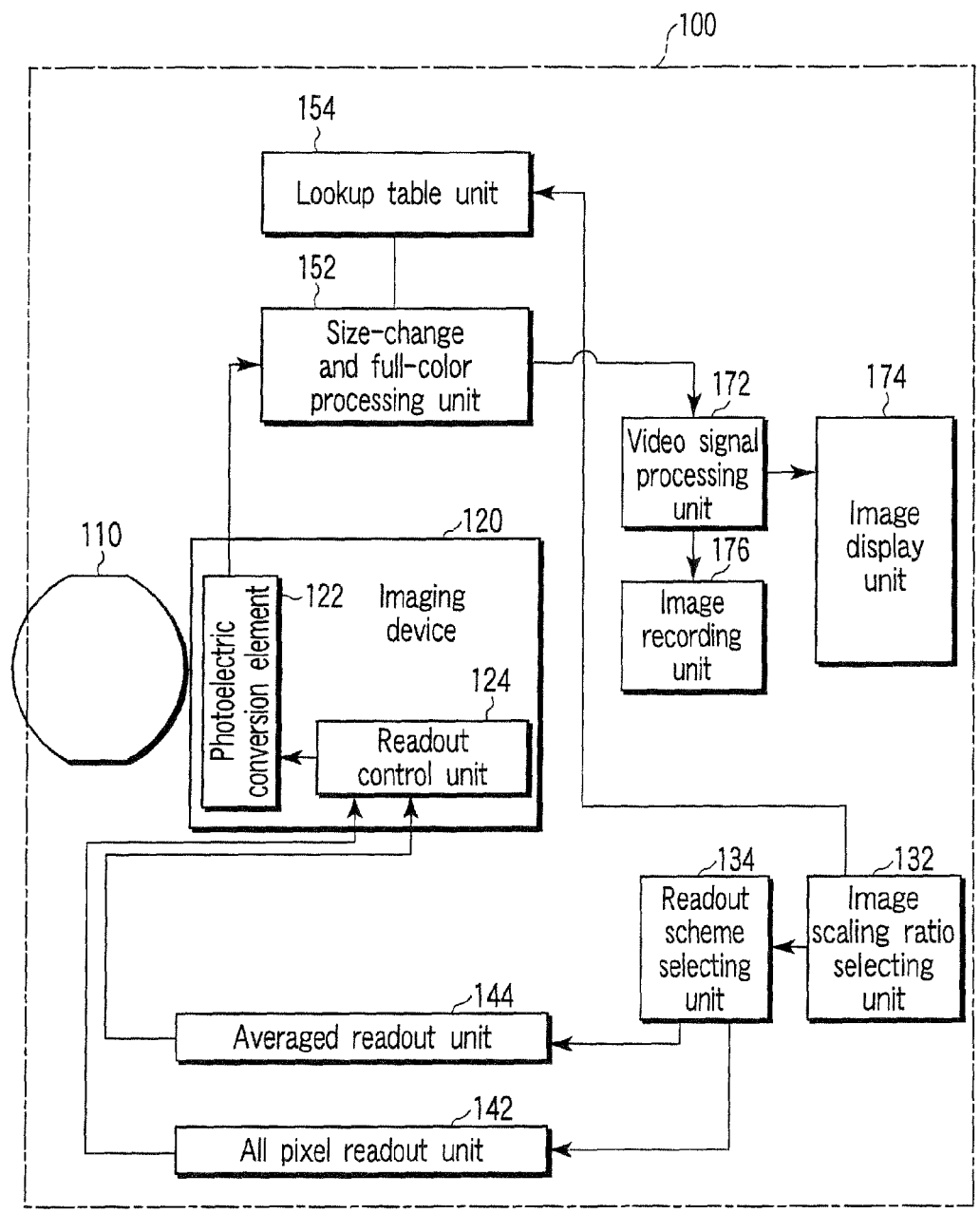
F I G. 1

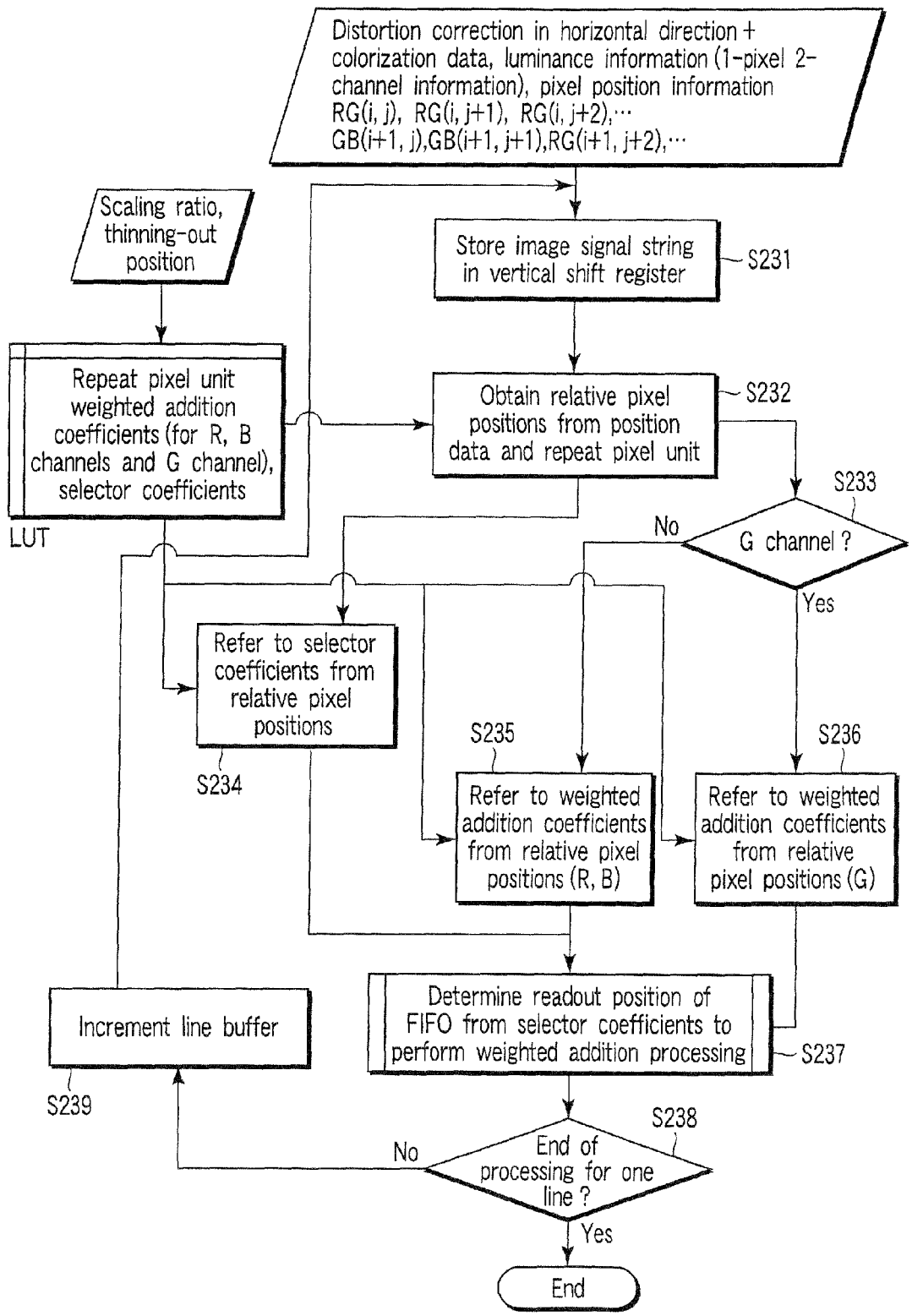
F I G. 23

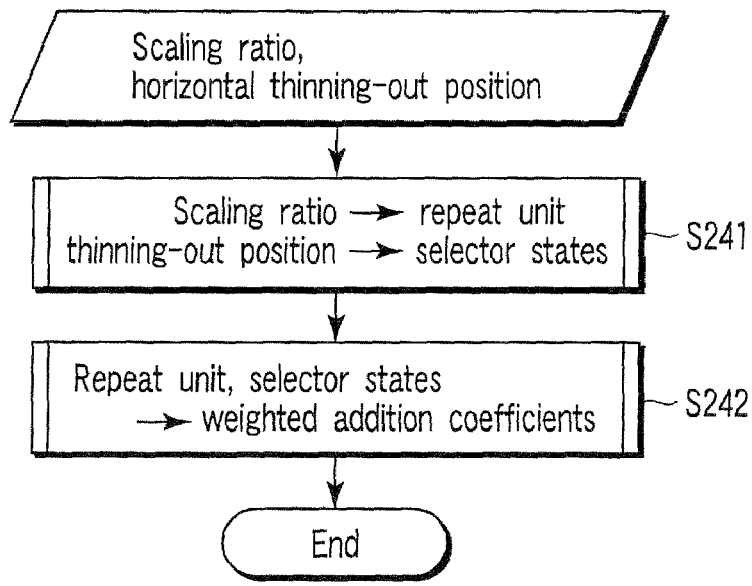
F I G. 24
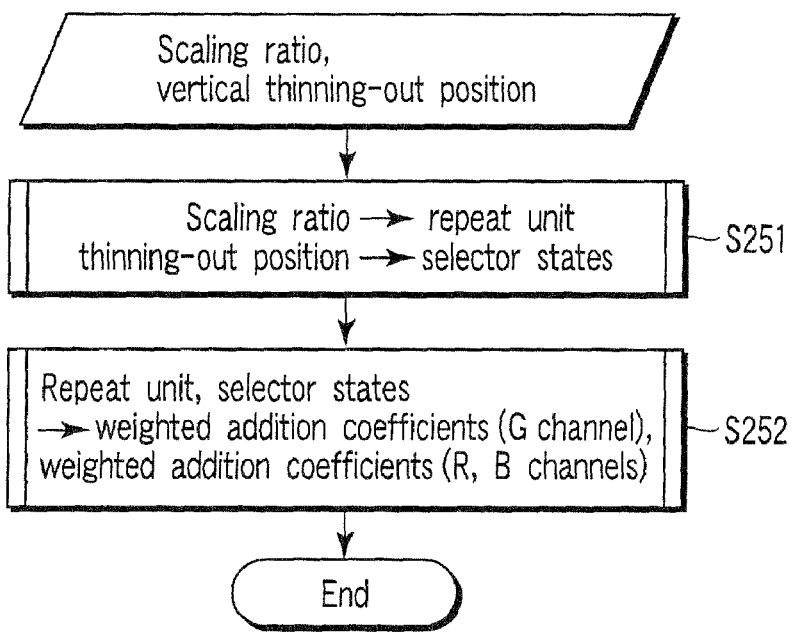
F I G. 25

IMAGING APPARATUS PROVIDED WITH IMAGE SCALING FUNCTION AND IMAGE DATA THINNING-OUT READOUT FUNCTION

CROSS-REFERENCE TO RELATED APPLICATIONS

The present application is a Continuation Application of U.S. application Ser. No. 11/366,734 filed Mar. 2, 2006 now abandoned, which is a Continuation Application of PCT Application No. PCT/JP2004/012636, filed Sep. 1, 2004, which was not published under PCT Article 21(2) in Japanese and which is based upon and claims the benefit of priority from prior Japanese Patent Application No. 2003-312722, filed Sep. 4, 2003, the entire contents of which are incorporated herein by reference.

BACKGROUND OF THE INVENTION

1. Field of the Invention

The present invention relates to a digital imaging apparatus and, more particularly, to a digital imaging apparatus which generates at high speed with high quality an image including pixels smaller than that of an imaging device mounted in the imaging apparatus.

2. Description of the Related Art

Recently, with the rapid proliferation of personal computers, digital cameras as image input devices have grown in demand. In addition, high-image-quality recording apparatuses such as digital video devices as moving image recording devices have been widely used.

There are several factors that determine the image quality of the above electronic still camera. Of these factors, the number of pixels of an imaging element is a significant factor that determines the resolution of a sensed image. For this reason, several electronic still cameras having as many as five million pixels or more have been commercialized. However, five million pixel data is not always required for all applications. On the contrary, images with reduced pixel sizes are often used as images to be displayed on the Web in the Internet.

The transfer times from imaging elements to image memories are a bottleneck in current digital cameras. There are few cameras of models that are large in the number of pixels and can perform high-speed continuous shooting. In addition, since a moving image shooting function is required for a digital camera as an additional function, data needs to be transferred to the memory at high speed. The amount of data to be processed needs therefore to be reduced in advance.

If the number of pixels of an output image is smaller than that of an imaging element, the amount of data to be transferred from the imaging element to the memory can be reduced by limiting the number of pixels to be used in advance or reading out pixels upon averaging them, thereby increasing the memory transfer speed.

According to size reduction by linear interpolation, a large-size image is formed by using all pixels, and a small-size image is formed by linear interpolation.

Such resizing by linear interpolation is preferable in terms of image quality. However, since linear interpolation is performed by capturing the data of all pixels, a large computation amount is required. This technique is not therefore suitable for the above continuous shooting function and moving image shooting function.

As a technique of reducing the amount of data to be read out from a memory, there is available a method of generating a reduced image by attaching an integration function to an imaging element and reading out a small number of data upon averaging them. Jpn. Pat. Appln. KOKAI Publication No. 2001-245141 discloses a high-speed image reduction method using this method.

Jpn. Pat. Appln. KOKAI Publication No. 2001-016441 discloses an apparatus which thins out data when the types of resolutions to be used are limited, and also corrects the distortion of data. This reference also discloses how data corresponding to 400 dpi is generated by an apparatus having a resolution of 600 dpi in an embodiment. If 600-dpi data is directly thinned out, the resultant data is distorted. For this reason, pixel data for correcting positional distortion is generated from the 600-dpi data by linear interpolation.

The method disclosed in Jpn. Pat. Appln. KOKAI Publication No. 2001-245141 is effective in reducing operation at a reduction ratio of about 20% or less. This method, however, cannot remove image distortion due to readout pixel positions by averaging based on integration alone in reducing operation at a high reduction ratio (by about 40% or more). In a wide range of reduction ratios, therefore, it is difficult to form an image with high image quality while making a size change.

The apparatus disclosed in Jpn. Pat. Appln. KOKAI Publication No. 2001-016441 forms data corresponding to 400 dpi by performing interpolation using all 600-dpi data obtained by scanning. In contrast to this, the present invention is directed to a new technique associated with thinning-out scanning which copes with a case wherein basic-resolution data (600-dpi data obtained by scanning in Jpn. Pat. Appln. KOKAI Publication No. 2001-016441) cannot be completely read out due to a limitation on readout time. For example, a data string with little distortion is generated from a thinned-out data string like that shown in FIG. 6(b) in Jpn. Pat. Appln. KOKAI Publication No. 2001-16441. The present invention therefore differs from the technique disclosed in Jpn. Pat. Appln. KOKAI Publication No. 2001-016441.

BRIEF SUMMARY OF THE INVENTION

The present invention is directed to, for example, a full color imaging apparatus. An imaging apparatus according to the present invention includes an imaging element which photoelectrically converts an image formed by an optical system, the imaging element being equipped with a color filter array (CFA) with different spectral transmittances. This apparatus includes a full color data generator which samples photoelectrically converted signals by the imaging element to obtain image signals having luminance information of each color of the CFA and sampling position information, and, when transforming a pattern of the pixel signals into full color data, generates full color data by obtaining weighting coefficients for generation of each color component of the full color data on the basis of a relative relationship between positions of a lattice pattern of the full color data to be generated and position information of the pixel signals.

The present invention is directed to, for example, a full color image data transforming method. An image data transforming method according to the present invention, in which each of pixel signals of image data to be input include information of one component constituting full color data, comprises a step of, when transforming a pattern of the pixel signals into full color data, generating full color data by obtaining weighting coefficients for generation of each color component of the full color data on the basis of a relative relationship between positions of a lattice pattern of the full color data and position information of the pixel signals.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 schematically shows the arrangement of an imaging apparatus according to the first embodiment of the present invention;

FIG. 17 shows one of two temporally adjacent frames in readout operation by repetitive 6/8 thinning-out readout operation in the third embodiment;

FIG. 18 shows the other of the two temporally adjacent frames in readout operation by repetitive 6/8 thinning-out readout operation in the third embodiment;

FIG. 23 shows the details of distortion correction processing in the vertical direction in the flow in FIG. 20;

FIG. 24 shows a procedure for calculating the contents of the LUT in FIG. 21; and FIG. 25 shows a procedure for calculating the contents of the LUT in FIG. 23.

DETAILED DESCRIPTION OF THE INVENTION

Figure 2:
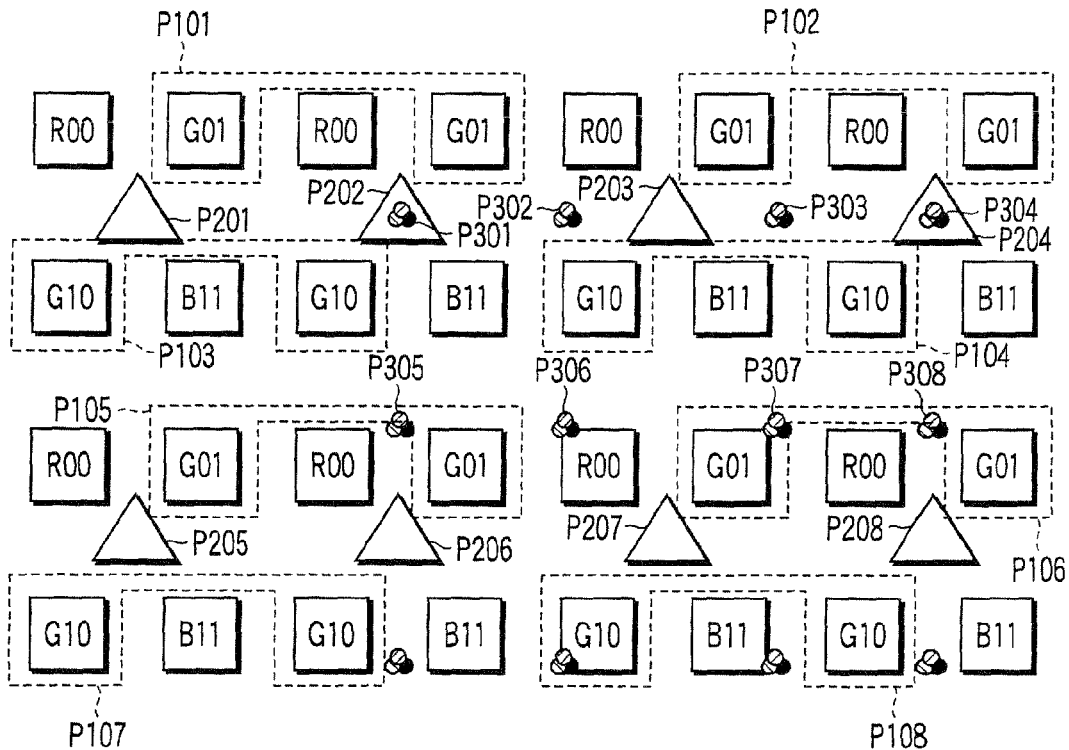
FIG. 2 shows an example of a manner of an averaged readout.

The embodiments of the present invention will be described below with reference to the views of the accompanying drawing.

First Embodiment

This embodiment is directed to a full color imaging apparatus which performs averaged readout operation as needed. FIG. 1 shows the arrangement of an imaging apparatus according to the first embodiment of the present invention.

An imaging apparatus 100 includes an image forming optical system 110 which forms an optical image of an object, and an imaging device 120 which outputs an image signal of a predetermined area of the optical image formed by the image forming optical system 110. The imaging device 120 includes an area-like photoelectric conversion element (imaging element) 122 which photoelectrically converts the optical image formed by the image forming optical system 110 to acquire digital image data (a set of image data), and a readout control unit 124 which reads out the image data acquired by the photoelectric conversion element 122 in accordance with a supplied readout rule. The photoelectric conversion element 122, which has, for example, a color filter array with a Bayer pattern, acquires the RGB data of the optical image formed by the image forming optical system 110. The photoelectric conversion element 122 can perform averaged readout operation, and may be an imaging element using a CMOS (to be simply referred to as a CMOS hereinafter) or a CCD. Using a CMOS makes it possible to perform added (averaged) readout operation of adjacent pixels in the horizontal direction. Using a CCD makes it possible to read out the added current values of adjacent pixels in the vertical direction.

The imaging apparatus 100 further includes an image scaling ratio selecting unit 132 which selects a scaling ratio for an image to be output, and a readout scheme selecting unit 134 which selects a readout scheme for image data to be read out from the photoelectric conversion element 122 by the readout control unit 124 in accordance with a selected image scaling ratio. The readout scheme selecting unit 134 selects either an averaged readout scheme or an all pixel readout scheme in accordance with a selected image scaling ratio. More specifically, the readout scheme selecting unit 134 selects the all pixel readout scheme when the reduction ratio of an image is high (for example, the image scaling ratio is 90% or more), and selects the averaged readout scheme when the reduction ratio is lower than the above reduction ratio.

The imaging apparatus 100 further includes an all pixel readout unit 142 and an averaged readout unit 144 which are activated in accordance with the readout scheme selected by the readout scheme selecting unit 134. The all pixel readout unit 142 supplies a readout rule corresponding to the all pixel readout scheme to the readout control unit 124. The averaged readout unit 144 supplies a readout rule corresponding to the averaged readout scheme to the readout control unit 124. The readout control unit 124 reads out pixel data from the photoelectric conversion element 122 in accordance with the readout rule.

The imaging apparatus 100 further includes a size-change and full-color processing unit 152 and a lookup table unit 154 storing filter coefficients. The size-change and full-color processing unit 152 performs size changing and full color processing by filter processing with respect to the image data read out from the photoelectric conversion element 122. The lookup table unit 154 supplies a proper filter coefficient to the size-change and full-color processing unit 152 in accordance with the scaling ratio selected by the image scaling ratio selecting unit 132.

The imaging apparatus 100 further includes a video signal processing unit 172 which performs predetermined processing (white balance adjustment, grayscale transformation, and edge enhancement) for the image signal output from the size-change and full-color processing unit 152, an image display unit 174 which displays an image in accordance with the image signal output from the video signal processing unit 172, and an image recording unit 176 which records an image in accordance with the image signal output from the video signal processing unit 172.

The photoelectric conversion element 122 has a color filter array with a Bayer pattern, and acquires RGB data at the corresponding positions. In added or averaged sampling, on a line on which R and G channels are adjacent to each other in the horizontal direction, R- and G-channel data of pixels are simultaneously acquired. On a line on which G and B channels are adjacent to each other, G- and B-channel data of pixels are simultaneously acquired.

FIG. 2 shows an example of a manner of the averaged readout (averaged sampling). For the sake of simplicity, G-channel two-pixel acquisition (added or averaged) is shown. In the manner of the averaged readout shown in FIG. 2, the same color (R-R, G-G, and B-B) data which are alternately located in the horizontal direction are simultaneously read out to obtain the average data of pixels.

As shown in FIG. 2, in adjacent two-pixel averaged readout operation by the operation of the CMOS, when two lines are alternately read out for each frame, the number of pixels per frame is ¼ (½ (vertical)·½(horizontal)) that in all pixel readout operation. The reduction ratio of the image with reference to the number of pixels becomes 50%. With respect to a scaling ratio (reduction ratio) of about 50% to 90%, averaged readout operation is performed first, and then enlargement interpolation and full color processing are performed. FIG. 2 is a schematic view corresponding to 4/3 times enlargement processing.

Referring to FIG. 2, reference symbols P101 to P108 denote positions where G-channel two-pixel readout operation is performed on the imaging element. In other words, reference symbols P101 to P108 denote pixel groups each including two pixels which are simultaneously read out upon being added or averaged. The sampled data of these pixels are represented by G101 to G108. In the photoelectrically converted data obtained by such sampling, positions corresponding to the positions of the center of gravity of the included pixels will be referred to as sampling positions.

The pixel array positions of full color data are determined in accordance with the image scaling ratio set by the image scaling ratio selecting unit 132. Referring to FIG. 2, for example, reference symbols P301 to P308 denote the lattice positions (lattice pattern) of full color data based on the consideration of scaling. Weighting coefficients for each averaged sampled data are set in accordance with the position of the center of gravity of each averaged sampling operation and the pixel array positions of the full color data, and full color data is generated by weighted addition.

According to an example of a method of computing weighting coefficients, positions P201 to P208 (indicated by Δ) of full color data of the same size as that of averaged sampling are set. Reference symbols G202, G203, G206, and G207 denote G-channel data at the positions P202, P203, P206, and P207. In order to generate the data G202, G203, G206, and G207, coefficients inversely proportional to the distances between the respective sampled data and the full color data are used with reference to the original sampled data G101 to G108. The following data are then obtained:

$$G202 = \qquad (1)$$
$$0.5196 \cdot G101 + 0.1039 \cdot G102 + 0.2354 \cdot G103 + 0.1414 \cdot G104$$
$$G203 =$$
$$0.1414 \cdot G101 + 0.2354 \cdot G102 + 0.1039 \cdot G103 + 0.5196 \cdot G104$$
$$G206 = 0.5196 \cdot G105 + 0.1039 \cdot G106 +$$
$$0.2354 \cdot G107 + 0.1414 \cdot G108$$
$$G207 = 0.1414 \cdot G105 + 0.2354 \cdot G106 + 0.1039 \cdot G107 + 0.5196 \cdot G108.$$

P201 to P208 are distributed on an equidistant lattice in the horizontal and vertical directions. In this case, for example, when 4/3 times enlargement processing is to be performed, since the number of lattice points becomes 3/4, a position P306 of a full color image after size changing operation can be given by using bilinear interpolation of G202, G203, G206, and G207:

$$G306 = \qquad (2)$$
$$0.25 \cdot (0.25 \cdot G202 + 0.75 \cdot G203) + 0.75 \cdot (0.25 \cdot G206 + 0.75 \cdot G207).$$

Likewise, when the size is changed to n/m times (1<n/m<2), bilinear interpolation of the kth row lth column G channel can be given as follows with reference to G301 as a reference point:

$$G_{k,l,m,n} = \qquad (3)$$
$$\left(1 - \left[k\frac{(n-m)}{m}\right]\right) \cdot \left(\left(1 - \left[l\frac{(n-m)}{m}\right]\right) \cdot G_{UL} + \left[l\frac{(n-m)}{m}\right] \cdot G_{UR}\right) + \left[k\frac{(n-m)}{m}\right] \cdot \left(\left(1 - \left[l\frac{(n-m)}{m}\right]\right) \cdot G_{DL} + \left[l\frac{(n-m)}{m}\right] \cdot G_{DR}\right).$$

where [x] represents the fractional portion of a rational number x, and $G_{UL}$, $G_{UR}$, $G_{DL}$, and $G_{DR}$ represent equidistant lattice points equal in number to actual sampling points, like P201 to P208. With respect to the positions where full color data are generated, the lattice point positions correspond to data located at upper left $G_{UL}$, upper right $G_{UR}$, down left $G_{DL}$, and down right $G_{DR}$. A substitution of equations (linear transformation for generating an equidistant lattice from actual sampled data) similar to equations (1) into this equation yields coefficients for generating G-channel values at specific positions after scaling operation.

Figure 3:
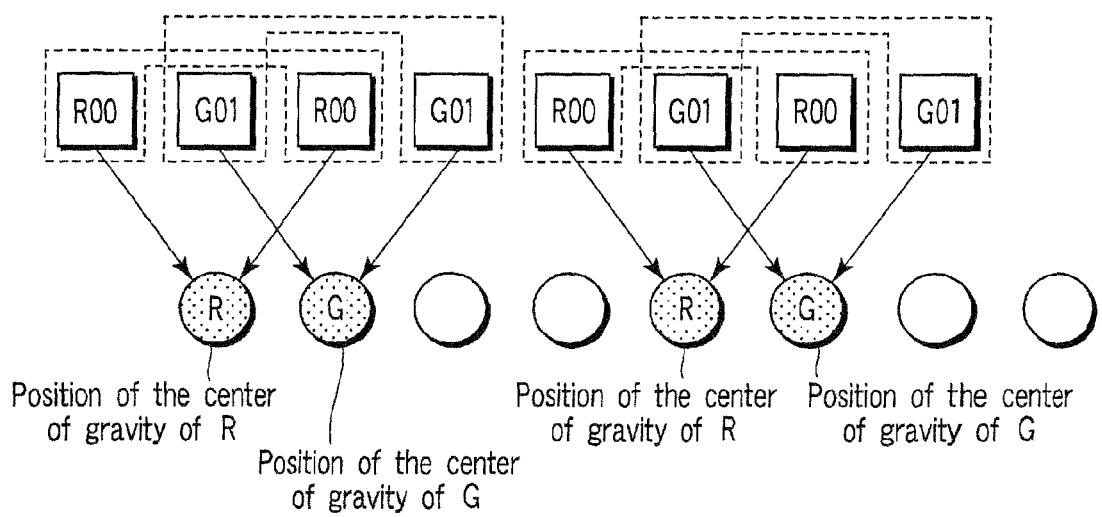
FIG. 3 shows the relationship between pixel positions and a position of the center of gravity in averaged readout operation.

In the case of averaged sampling in FIG. 2, the relationship between the positions of the center of gravity of sampling is unequidistant but corresponds to an iterated structure. As shown in FIG. 3, according to the positional relationship between the centers of gravity of R and G channels having undergone averaged sampling, adjacent channels are repeated at intervals of one pixel, and distant channels are repeated at intervals of three pixels. Therefore, the linear transformation indicated by equations (1) becomes cyclic, and four types of coefficients are to be used.

The lookup table unit 154 stores weighting coefficients corresponding to the image scaling ratio obtained from equations (1) and (3), and supplies the coefficients to the size-change and full-color processing unit 152. The size-change and full-color processing unit 152 performs weighted addition and generates full color data having undergone a size change. The size-change and full-color processing unit 152 performs enlargement interpolation and full color processing by performing filter processing once. The video signal processing unit 172 performs grayscale transformation, color balance, color enhancement, and edge enhancement for an output signal from the size-change and full-color processing unit 152. The signal processed by the video signal processing unit 172 is displayed on the image display unit 174, and is recorded by the image recording unit 176 as needed.

By performing full color processing in averaged sampling in consideration of the relationship between sampling positions and the positions of full color data to be generated, misregistration and blurring for each color can be reduced. This makes it possible to achieve improvements in terms of band and edge distortion and realize false color reduction.

Second Embodiment

Figure 4:
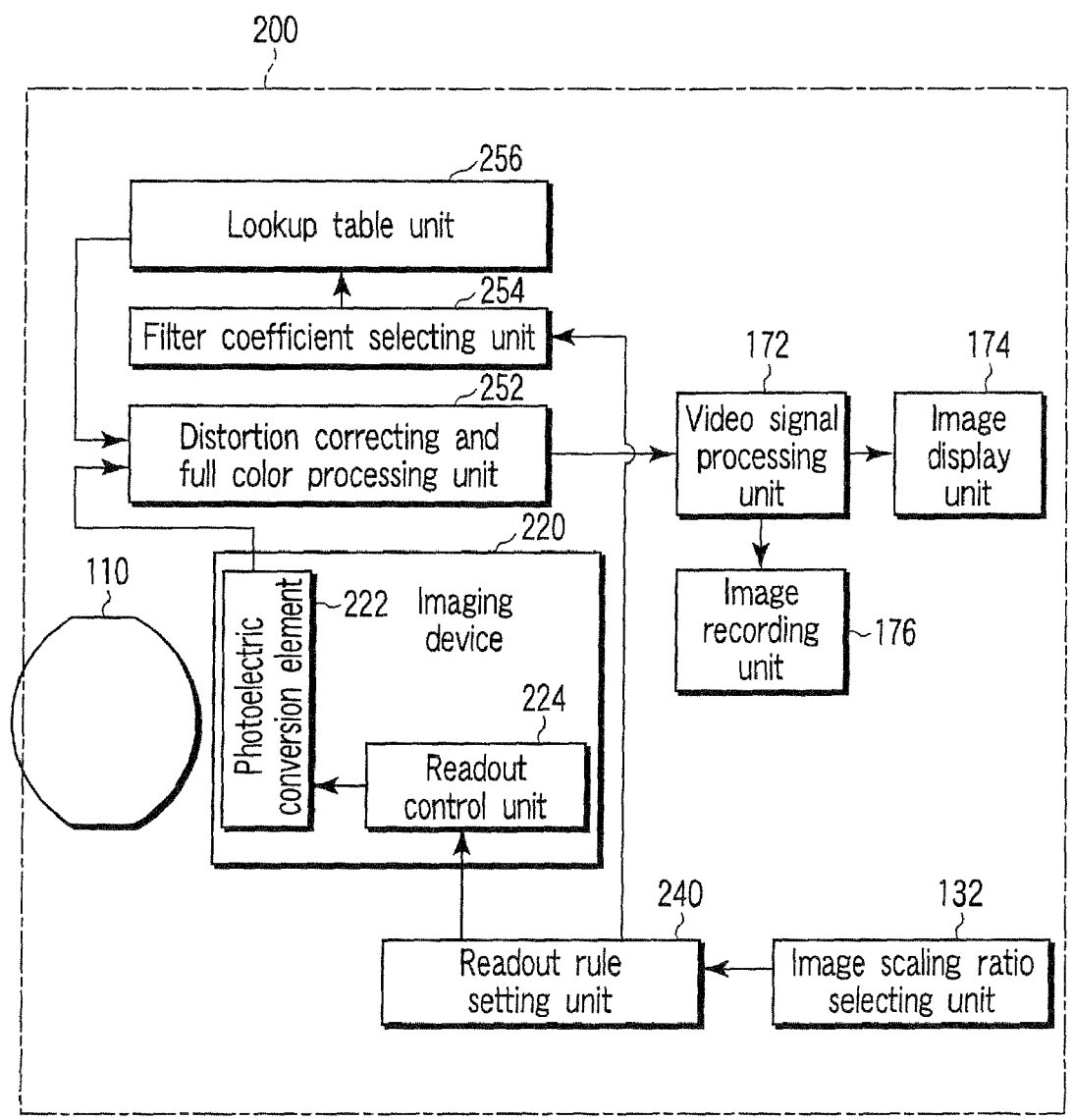
FIG. 4 shows the arrangement of an imaging apparatus according to the second embodiment of the present invention.

This embodiment is directed to a full color imaging apparatus which performs thinning-out readout operation as needed. FIG. 4 shows the arrangement of an imaging apparatus according to the second embodiment of the present invention. The elements denoted by the same reference numerals as those of the imaging apparatus 100 according to the first embodiment are identical to those in FIG. 4, and a detailed description thereof will be omitted to avoid repetition in the following description.

An imaging apparatus 200 includes an image forming optical system 110 which forms an optical image of an object, and an imaging device 220 which outputs an image signal of a predetermined area of the optical image formed by the image forming optical system 110. The imaging device 220 includes an area-like photoelectric conversion element (imaging element) 222 which acquires digital image data (a set of image data) by photoelectrically converting the optical image formed by the image forming optical system 110, and a readout control unit 224 which reads out the image data acquired by the photoelectric conversion element 222 in accordance with a supplied readout rule. The photoelectric conversion element 222 has, for example, a color filter array with a Bayer pattern, and acquires the RGB data of the optical image formed by the image forming optical system 110.

The imaging apparatus 200 further includes an image scaling ratio selecting unit 132 which selects a scaling ratio for an image to be output, and a readout rule setting unit 240 which selects a readout rule for the photoelectric conversion element 222 in accordance with a selected image scaling ratio. The readout rule setting unit 240 provides data associated with a readout rule for the readout control unit 224 which controls readout operation from the photoelectric conversion element 222 in accordance with a selected image scaling ratio.

The imaging apparatus 200 further includes a distortion-correction and full-color processing unit 252, a filter coefficient selecting unit 254, and a lookup table unit 256. The distortion-correction and full-color processing unit 252 performs distortion correction and full color processing for the digital image data read out from the photoelectric conversion element 222 by filter processing. The lookup table unit 256 stores filters used for filter processing by the distortion-correction and full-color processing unit 252 in the form of a lookup table. The filter coefficient selecting unit 254 selects proper filter coefficients in accordance with the image scaling ratio selected by the image scaling ratio selecting unit 132, and supplies the coefficients from the lookup table unit 256 to the distortion-correction and full-color processing unit 252.

The imaging apparatus 200 further includes a video signal processing unit 172 which performs predetermined processing (white balance adjustment, grayscale transformation, and edge enhancement) for an output signal from the distortion-correction and full-color processing unit 252, an image display unit 174 which displays an image in accordance with an output signal from the video signal processing unit 172, and an image recording unit 176 which records an image in accordance with an output signal from the video signal processing unit 172.

The readout rule setting unit 240 supplies a thinning-out readout rule to the readout control unit 224 with respect to an image scaling ratio, i.e., an image reduction, of less than 100%. In 75% reduction processing, for example, a rule of reading out six pixels out of eight pixels in the horizontal and vertical directions is supplied to the readout control unit 224. The readout control unit 224 reads out pixel data in a corresponding range in the pixel array in the photoelectric conversion element 222 on the basis of the thinning-out readout rule supplied from the readout rule setting unit 240. As a result, thinned-out image data is output from the imaging device 220.

The data read out from the photoelectric conversion element 222 in accordance with such a thinning-out rule is supplied to the distortion-correction and full-color processing unit 252. The data from the readout rule setting unit 240 is provided for the filter coefficient selecting unit 254. The filter coefficient selecting unit 254 provides filter coefficients corresponding to the readout rule to the distortion-correction and full-color processing unit 252.

In this embodiment, necessary filter coefficients are obtained by being selected from the lookup table (LUT). However, the LUT need not always be used, and filter coefficients may be calculated by computation corresponding to the readout rule set by the readout rule setting unit 240. Filter coefficient selection using the LUT requires a large amount of memory to store the LUT, but can perform computation with a low load. In contrast to this, filter coefficient selection without using any LUT requires a high load for computation, but does not require much memory.

The photoelectric conversion element 222 may be, for example, either a CMOS or a CCD. The photoelectric conversion element 222 can perform thinning-out readout operation and can read image data at an arbitrary position upon thinning out. Thinning-out readout operation makes it possible to read out pixels in a specific area with the number of pixels smaller than that when all pixels are read out.

If, for example, the photoelectric conversion element 222 is a CMOS, an imaging device 220 can designate readout positions by using shift registers in both the horizontal direction and the vertical direction.

Letting C(i, j) be the jth line ith element, and C(i+1, j), C(i+2, j), C(i+3, j), C(i+4, j), C(i+5, j), C(i+6, j), C(i+7, j), C(i+8, j), . . . , be pixels in the horizontal direction, readout operation can be performed while data at arbitrary positions in the horizontal direction are thinned out like, for example, C(i+1, j), C(i+2, j), C(i+3, J), C(i+4, j), C(i+7, j), C(i+8, j), . . .

In the vertical direction as well, in the same manner as described above, pixels arranged in the line direction like the jth line, (j+1)th line, (j+2)th line, . . . , can be read out while data on arbitrary lines are thinned out.

If the photoelectric conversion element 222 is a CCD, since charges are read out from the CCD while being shifted in the horizontal direction, the imaging device 220 can read out all pixels in the horizontal direction while performing thinning-out readout operation in the vertical direction.

The distortion-correction and full-color processing unit 252 interpolates omitted information with respect to the digital image data thinned out and read out in this manner, and performs magnification conversion and color interpolation.

The photoelectric conversion element 222 has a color filter array with a Bayer pattern, and acquires RGB data at the corresponding positions. The photoelectric conversion element 222 further sets an image data acquisition area on the imaging element in accordance with the image scaling ratio selecting unit 132, and reads out image data acquired by the photoelectric conversion element upon thinning out pixels as needed. The positions of image data read out in this manner are set in advance, and the pixel array positions of full color data to be generated are determined in accordance with the image scaling ratio set by the image scaling ratio selecting unit 132. The lookup table unit 256 stores weighting coefficients for pixel data subjected to thinning-out readout operation corresponding to an image scaling ratio in accordance with the positional relationship between thinning-out readout pixel positions and the pixel array positions of full color data.

Figures 5, 6:
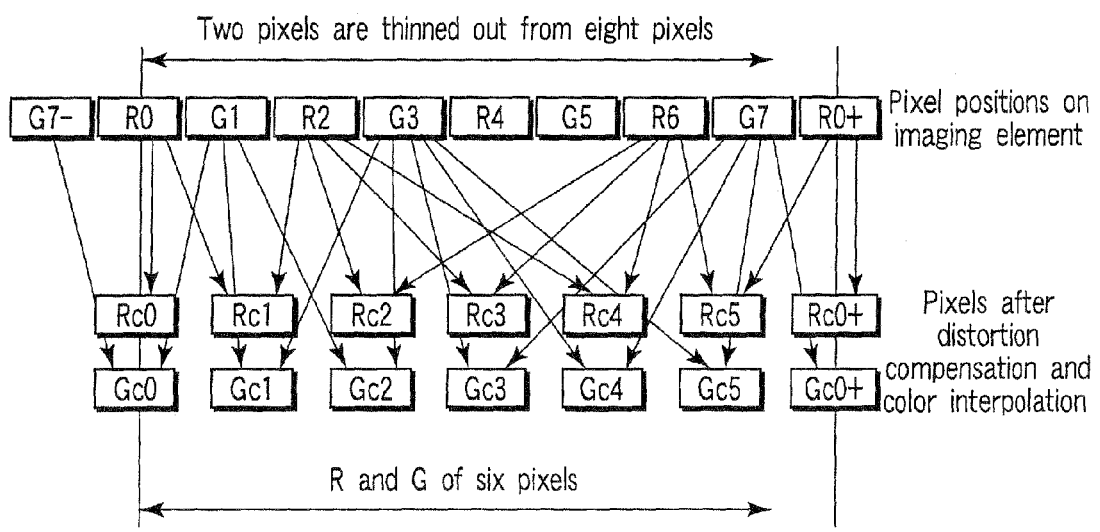
FIG. 5 shows a thinning-out readout rule corresponding to scaling of a 75% reduction in the second embodiment.
FIG. 6 schematically shows how data which are read out from an RG line on an imaging element equipped with a color filter array while two pixels are thinned out from eight pixels in the horizontal direction are transformed into equidistant 6-pixel data having R and G color information.

FIG. 5 shows a thinning-out readout rule corresponding to scaling of 75% reduction. The readout rule in FIG. 5 is repeated on an imaging element including a CFA (Color Filter Array). FIG. 6 schematically shows how data which are read out from an RG line while two pixels are thinned out from eight pixels in the horizontal direction are transformed into equidistant 6-pixel data having R and G color information. The transformation shown in FIG. 6 is expressed in a matrix form as follows:

$$\begin{pmatrix} Rc_0 \\ Gc_0 \\ Rc_1 \\ Gc_1 \\ Rc_2 \\ Gc_2 \\ Rc_3 \\ Gc_3 \\ Rc_4 \\ Gc_4 \\ Rc_5 \\ Gc_5 \end{pmatrix} = \begin{pmatrix} 0 & 1 & 0 & 0 & 0 & 0 & 0 & 0 \\ \frac{1}{2} & 0 & \frac{1}{2} & 0 & 0 & 0 & 0 & 0 \\ 0 & \frac{1}{3} & 0 & \frac{2}{3} & 0 & 0 & 0 & 0 \\ 0 & 0 & \frac{5}{6} & 0 & \frac{1}{6} & 0 & 0 & 0 \\ 0 & 0 & 0 & \frac{5}{6} & 0 & \frac{1}{6} & 0 & 0 \\ 0 & 0 & \frac{1}{6} & 0 & \frac{5}{6} & 0 & 0 & 0 \\ 0 & 0 & 0 & \frac{1}{2} & 0 & \frac{1}{2} & 0 & 0 \\ 0 & 0 & 0 & 0 & \frac{3}{4} & 0 & \frac{1}{4} & 0 \\ 0 & 0 & 0 & \frac{1}{6} & 0 & \frac{5}{6} & 0 & 0 \\ 0 & 0 & 0 & 0 & \frac{5}{12} & 0 & \frac{7}{12} & 0 \\ 0 & 0 & 0 & 0 & 0 & \frac{2}{3} & 0 & \frac{1}{3} \\ 0 & 0 & 0 & 0 & \frac{1}{12} & 0 & \frac{11}{12} & 0 \end{pmatrix} \cdot \begin{pmatrix} G_{7-} \\ R_0 \\ G_1 \\ R_2 \\ G_3 \\ R_6 \\ G_7 \\ R_{0+} \end{pmatrix} \quad (4)$$

where $Rc_i$ and $Gc_i$ represent data of the respective colors at the ith pixel which are transformed at equal intervals. As shown in FIG. 6, eight pixels are formed into one block with reference to the position of $R_0$, and a pixel of the left block and a pixel of the right block are respectively represented by such as $G_{7-}$ and $R_{0+}$. As in the above case, if thinning-out distortion correction is performed on an RG line, pixels having R and G data are arranged at equal intervals in the horizontal direction on the corresponding line, and the RG lines and GB lines having undergone such correction are alternately arranged in the vertical direction.

Figure 7:
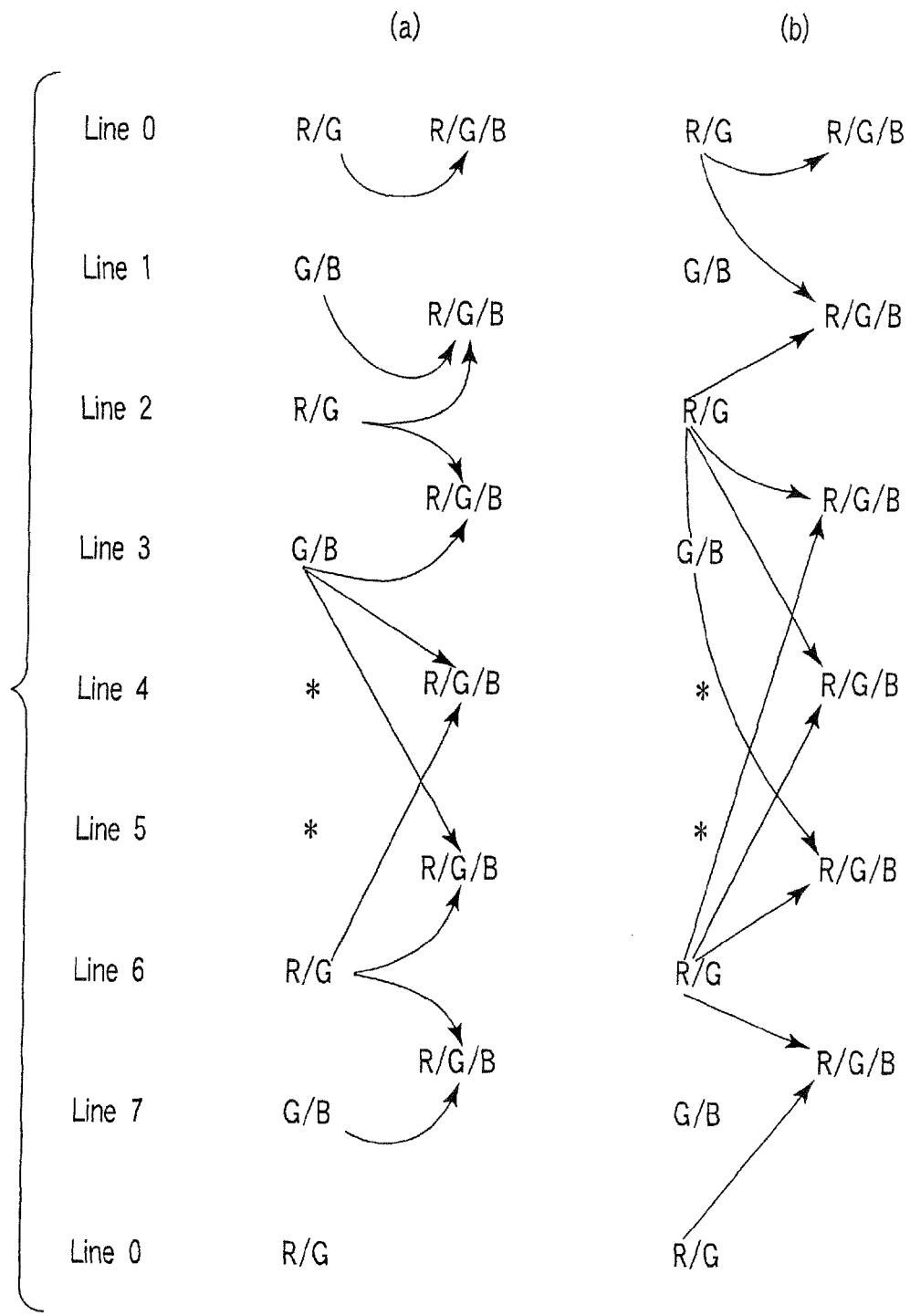
FIG. 7 schematically shows distortion correction in the vertical direction and full color processing in the second embodiment.

FIG. 7 schematically shows distortion correction and full color processing in the vertical direction. As shown in FIG. 5, readout operation is performed while two lines are thinned out from eight lines, and the readout data are transformed into equidistant 6-line full color data in the vertical direction. After the above distortion correction in the horizontal direction and color interpolation processing, all the readout lines include G-channel data, and hence unequidistant 6-line G-channel data are transformed into equidistant 6-line data. The following is a matrix expression of this transformation:

$$\begin{pmatrix} Gv_0 \\ Gv_1 \\ Gv_2 \\ Gv_3 \\ Gv_4 \\ Gv_5 \end{pmatrix} = \begin{pmatrix} 1 & 0 & 0 & 0 & 0 & 0 \\ 0 & \frac{2}{3} & \frac{1}{3} & 0 & 0 & 0 \\ 0 & 0 & \frac{1}{3} & \frac{2}{3} & 0 & 0 \\ 0 & 0 & 0 & \frac{2}{3} & \frac{1}{3} & 0 \\ 0 & 0 & 0 & \frac{2}{9} & \frac{7}{9} & 0 \\ 0 & 0 & 0 & 0 & \frac{1}{3} & \frac{2}{3} \end{pmatrix} \cdot \begin{pmatrix} Gc_0 \\ Gc_1 \\ Gc_2 \\ Gc_3 \\ Gc_6 \\ Gc_7 \end{pmatrix} \quad (5)$$

On the other hand, R- and B-channel data exist on either an even-numbered line or odd-numbered line, and hence are expressed as follows by using the same transformation coefficients as those for distortion correction in the horizontal direction and color interpolation processing:

$$\begin{pmatrix} Rv_0 \\ Bv_0 \\ Rv_1 \\ Bv_1 \\ Rv_2 \\ Bv_2 \\ Rv_3 \\ Bv_3 \\ Rv_4 \\ Bv_4 \\ Rv_5 \\ Bv_5 \end{pmatrix} = \begin{pmatrix} 0 & 1 & 0 & 0 & 0 & 0 & 0 & 0 \\ \frac{1}{2} & 0 & \frac{1}{2} & 0 & 0 & 0 & 0 & 0 \\ 0 & \frac{1}{3} & 0 & \frac{2}{3} & 0 & 0 & 0 & 0 \\ 0 & 0 & \frac{5}{6} & 0 & \frac{1}{6} & 0 & 0 & 0 \\ 0 & 0 & 0 & \frac{5}{6} & 0 & \frac{1}{6} & 0 & 0 \\ 0 & 0 & \frac{1}{6} & 0 & \frac{5}{6} & 0 & 0 & 0 \\ 0 & 0 & 0 & \frac{1}{2} & 0 & \frac{1}{2} & 0 & 0 \\ 0 & 0 & 0 & 0 & \frac{3}{4} & 0 & \frac{1}{4} & 0 \\ 0 & 0 & 0 & \frac{1}{6} & 0 & \frac{5}{6} & 0 & 0 \\ 0 & 0 & 0 & 0 & \frac{5}{12} & 0 & \frac{7}{12} & 0 \\ 0 & 0 & 0 & 0 & 0 & \frac{2}{3} & 0 & \frac{1}{3} \\ 0 & 0 & 0 & 0 & \frac{1}{12} & 0 & \frac{11}{12} & 0 \end{pmatrix} \cdot \begin{pmatrix} Bc_{-1} \\ Rc_0 \\ Bc_1 \\ Rc_2 \\ Bc_3 \\ Rc_6 \\ Bc_7 \\ Rc_8 \end{pmatrix} \quad (6)$$

where $Gc_0$, $Rc_0$, and $Bc_0$ represent G, R, and B data on the 0th line, respectively. Subsequently, $Gc_i$, $Rc_i$, and $Bc_i$ represent G, R, and B data on the ith line, respectively.

Distortion Correction and Color Interpolation Processing

FIGS. 8 to 13 each schematically show the arrangement of a pipeline for executing the distortion correction and color interpolation processing indicated by equation (4). Referring to FIGS. 8 to 13, an image signal 600 is on an RG line, and data are read out from the right to the left and are time-serially arranged like $R_{6-}$, $G_{7-}$, $R_0$, $G_1$, $R_2$, .... FIGS. 8 to 13 shows states on a clock basis.

This pipeline includes a five-tap shift register 611, a selector 622 to which data from the first and third registers of the shift register 611 are input, a selector 621 to which data from the third and fifth registers of the shift register 611 are input, a multiplier 631 which multiplies output data from the selector 622 by a coefficient k4, a multiplier 632 which multiplies output data from the selector 621 by a coefficient k3, an adder 641 which adds output data from the multiplier 631 to output data from the multiplier 632, a multiplier 633 which multiplies data from the second register of the shift register 611 by a coefficient k2, a multiplier 634 which multiplies data from the fourth register of the shift register 611 by a coefficient k1, and an adder 642 which adds output data from the multiplier 633 to output data from the multiplier 634.

The selector 621 and the selector 622 each have an input in1 and an input in2 and selectively output one of data input to the inputs in1 and in2. The states of the selectors 621 and 622 can be changed on a clock basis and are switched in conjunction with each other. Referring to FIGS. 8 to 13, each of the selectors 621 and 622 outputs data input to one of the inputs in1 and in2 which is indicated by an ellipse.

Figure 8:
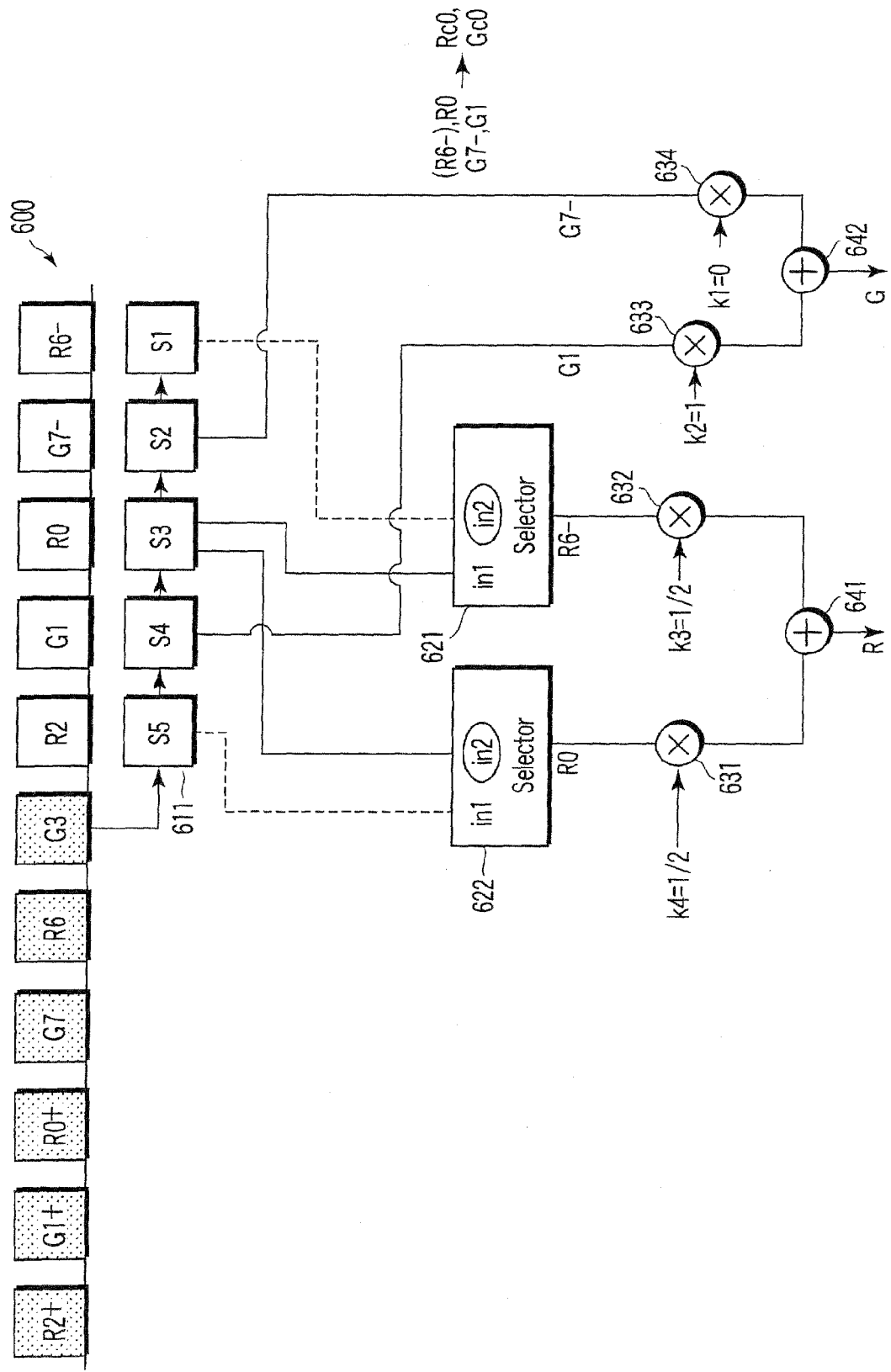
FIG. 8 schematically shows the arrangement of a pipeline which executes distortion correction and color interpolation processing in the second embodiment, and shows a state wherein the data of the five pixels represented by $R_{6-}$, $G_{7-}$, $R_0$, $G_1$, and $R_2$ are read out.

FIG. 8 shows a state wherein the data of the five pixels represented by $R_{6-}$, $G_{7-}$, $R_0$, $G_1$, and $R_2$ are read out. In the state shown in FIG. 8, both the selector 621 and the selector 622 output data input to the inputs in2. Therefore, the selector 621 outputs $R_{6-}$, and the selector 622 outputs $R_0$. The multiplier 631 multiplies $R_0$ by ½. The multiplier 632 multiples $R_{6-}$ by ½. The adder 641 adds them. The multiplier 633 multiplies $G_1$ by 1. The multiplier 634 multiples $G_{7-}$ by 0. The adder 642 adds them and outputs the resultant data.

Figure 9:
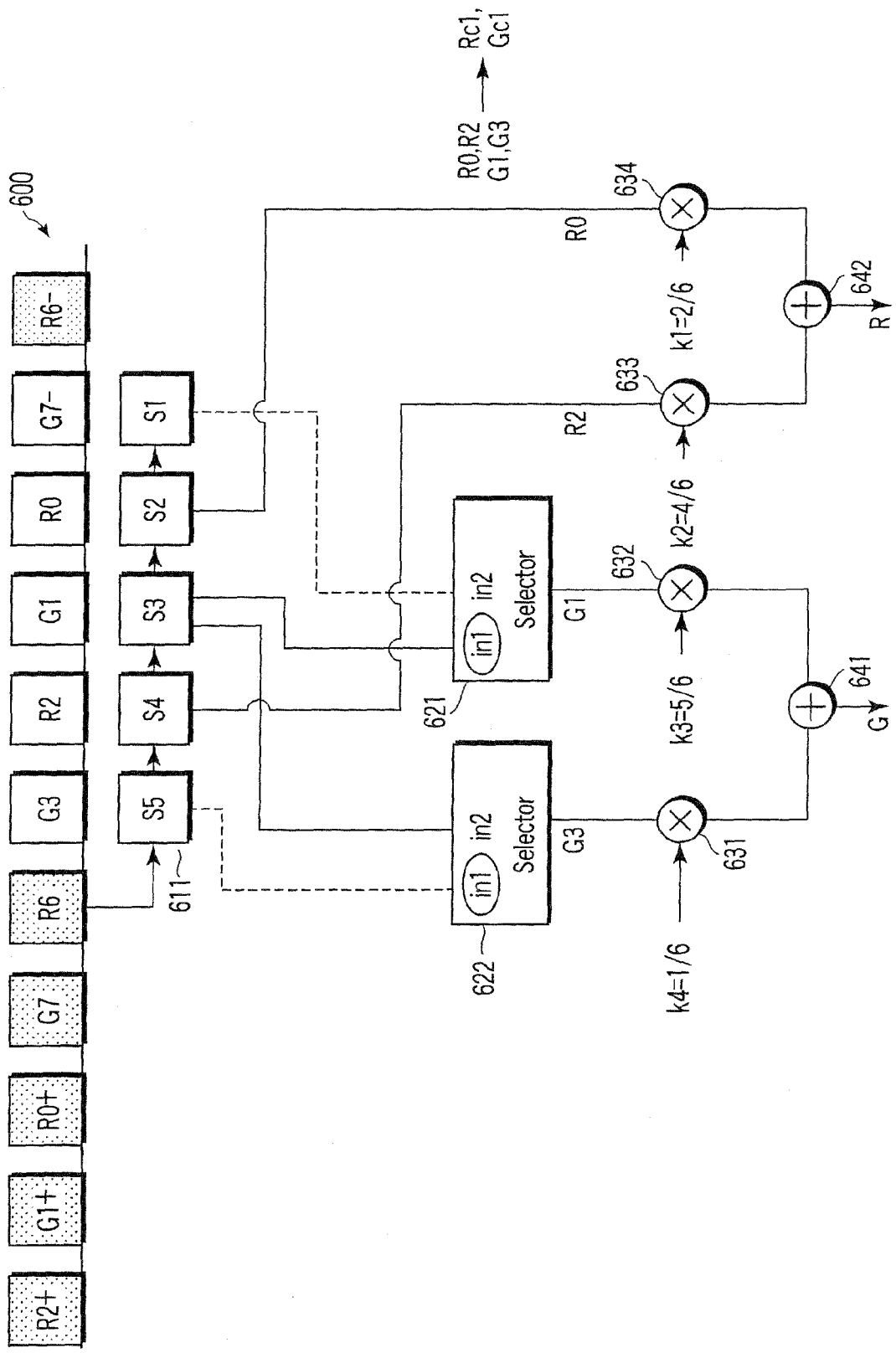
FIG. 9 shows the state of the pipeline after the lapse of one clock from the state in FIG. 8, and shows a state wherein the data of the five pixels represented by $G_{7-}$, $R_0$, $G_1$, $R_2$, and $G_3$ are read out.
Figure 10:
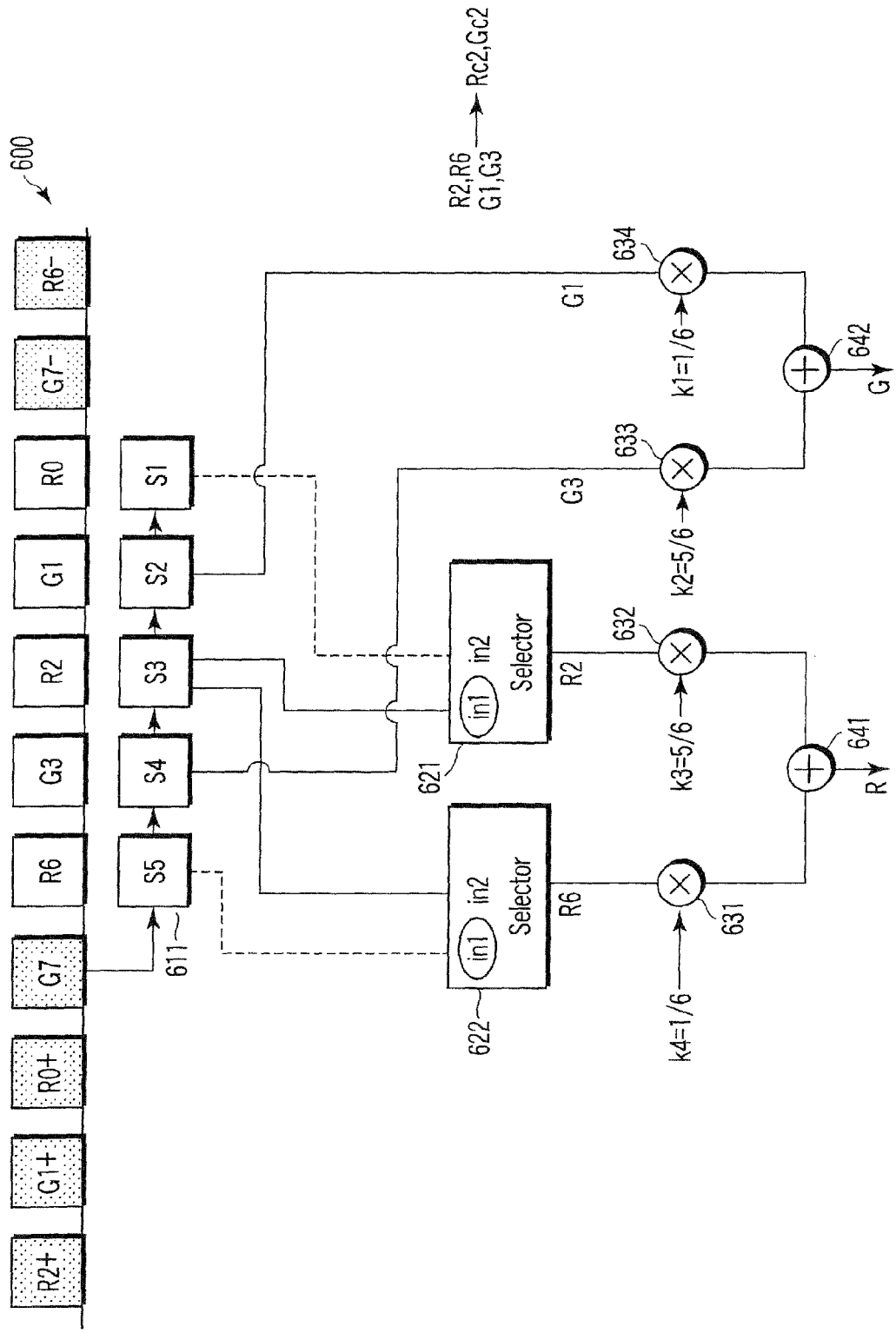
FIG. 10 shows the state of the pipeline after the lapse of one clock from the state in FIG. 9.
Figure 11:
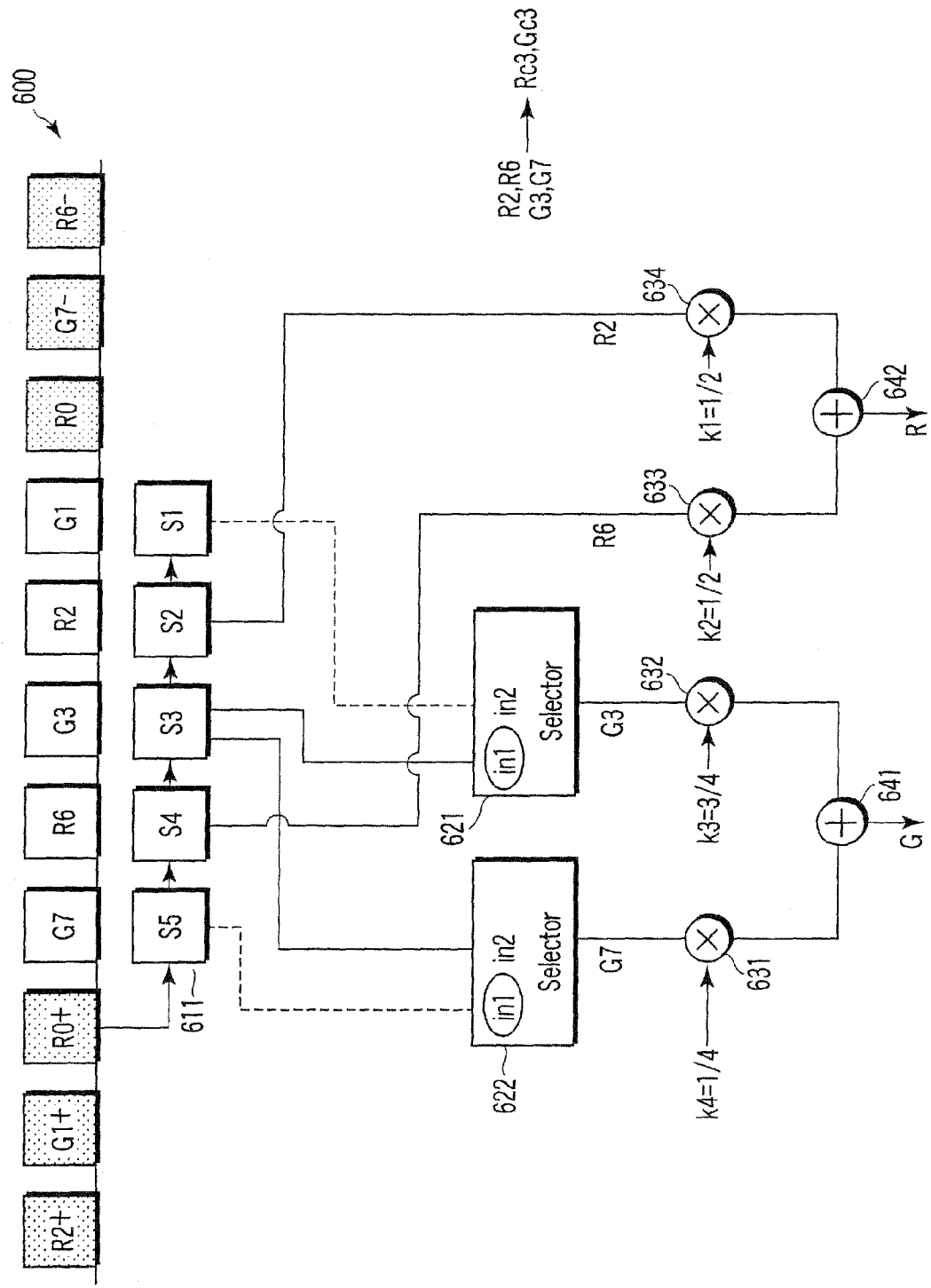
FIG. 11 shows the state of the pipeline after the lapse of one clock from the state in FIG. 10.
Figure 12:
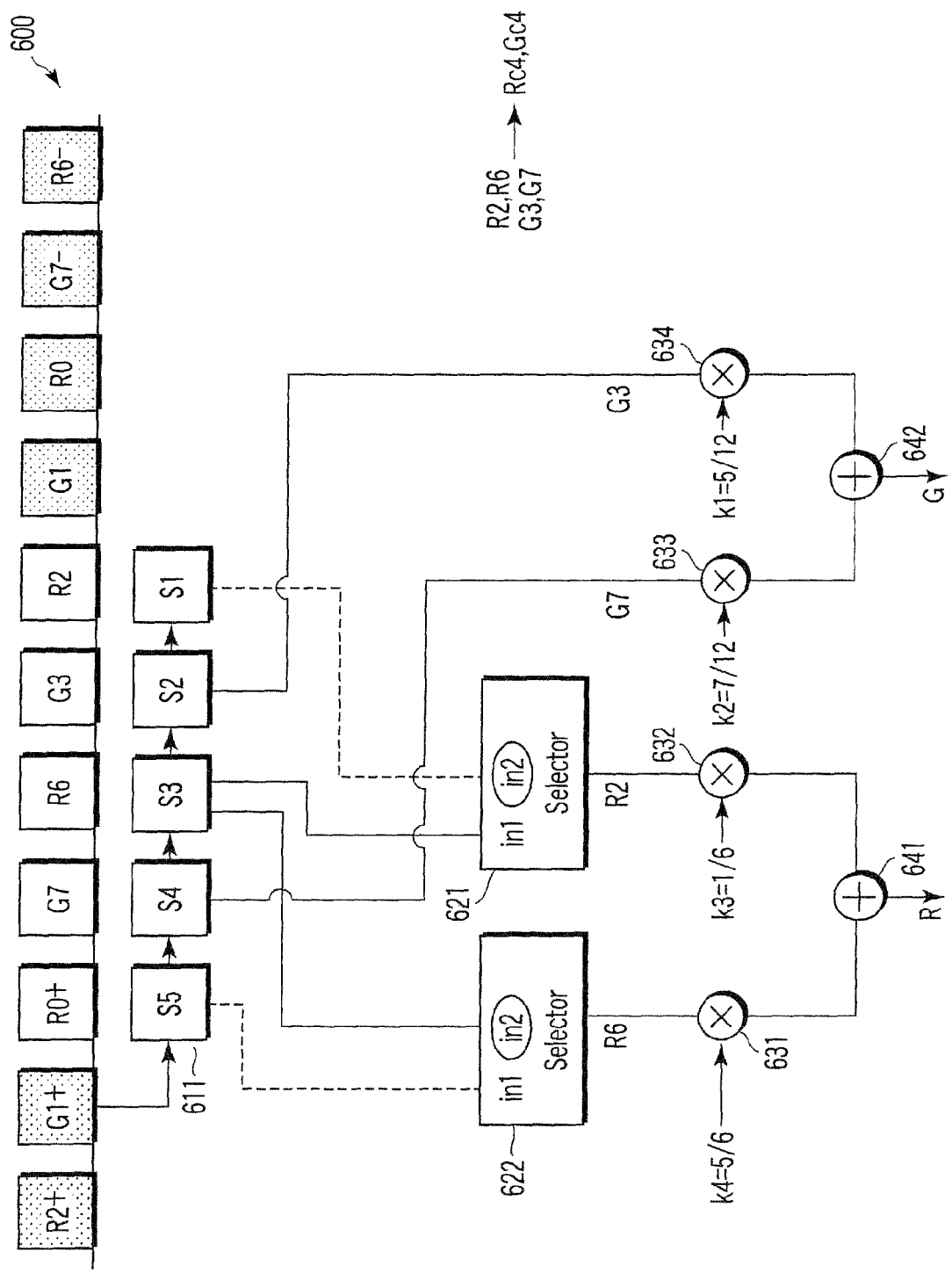
FIG. 12 shows the state of the pipeline after the lapse of one clock from the state in FIG. 11.
Figure 13:
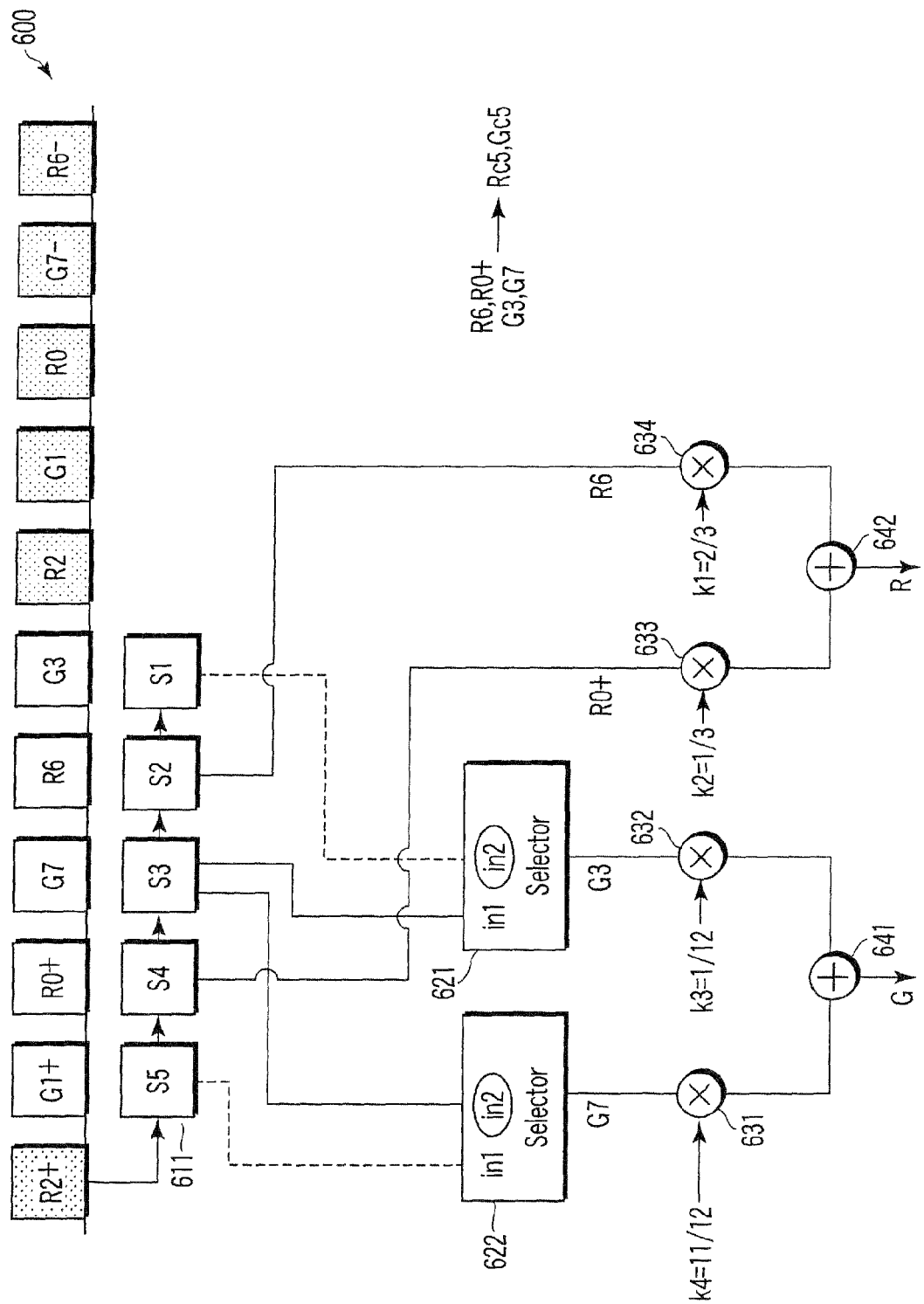
FIG. 13 shows the state of the pipeline after the lapse of one clock from the state in FIG. 12.

FIG. 9 shows a state after the lapse of one clock from the state in FIG. 8. FIG. 9 therefore shows a state wherein the data input to the shift register 611 is updated by one clock, and the data of the five pixels represented by $G_{7-}$, $R_0$, $G_1$, $R_2$, and $G_3$ are read out. In the state in FIG. 9, the same operation as that in the state in FIG. 8 is performed.

Likewise, FIGS. 10 to 13 each show a state after the lapse of one clock from the immediately preceding state (the state indicated by a figure number smaller by one). The same operation is performed in each of the states shown in FIGS. 10 to 13.

The states in FIGS. 8 to 13 correspond to computation for generating $Rc_0$, $Gc_0$, ..., $Rc_5$, and $Gc_5$ in equation (4). By performing weighted addition processing for each clock, an output equivalent to the left side of equation (4) can be obtained by pipeline processing. In the pipeline shown in FIGS. 8 to 13, the adders alternately output color channel data on a clock basis. When time-series data are to be stored in a memory for each channel, it suffices to place selectors behind the adders. Table 1 shows a transition state in such pipeline processing.

TABLE 1

| | | | | | | Selector Output | | | | Output from | | | Output from |
|---|---|---|---|---|---|---|---|---|---|---|---|---|---|
| S5 | S4 | S3 | S2 | S1 | State | 622 | 621 | K4 | K3 | multiplier 641 | k2 | k1 | multiplier 642 |
| $G_3$ | $R_2$ | $G_1$ | $R_0$ | $G_{7-}$ | $R_{6-}$ | 2 | $R_0$ | $R_{6-}$ | 1 | 0 | $Rc_0 = 1 \times R_0 + 0 \times R_{6-}$ | 1/2 | 1/2 | $Gc_0 = 1/2 \times G_1 + 1/2 \times G_{7-}$ |
| $R_6$ | $G_3$ | $R_2$ | $G_1$ | $R_0$ | $G_{7-}$ | 1 | $G_3$ | $G_1$ | 1/6 | 5/6 | $Gc_1 = 1/6 \times G_3 + 5/6 \times G_1$ | 2/3 | 1/3 | $Rc_1 = 2/3 \times R_2 + 1/3 \times R_0$ |
| $G_7$ | $R_6$ | $G_3$ | $R_2$ | $G_1$ | $R_0$ | 1 | $R_6$ | $R_2$ | 1/6 | 5/6 | $Rc_2 = 1/6 \times R_6 + 5/6 \times R_2$ | 5/6 | 1/6 | $Gc_2 = 5/6 \times G_3 + 1/6 \times G_1$ |
| $R_{0+}$ | $G_7$ | $R_6$ | $G_3$ | $R_2$ | $G_1$ | 1 | $G_7$ | $G_3$ | 3/4 | 1/4 | $Gc_3 = 3/4 \times G_7 + 1/4 \times G_3$ | 1/2 | 1/2 | $Rc_3 = 1/2 \times R_6 + 1/2 \times R_2$ |
| $G_{1+}$ | $R_{0+}$ | $G_7$ | $R_6$ | $G_3$ | $R_2$ | 2 | $R_6$ | $R_2$ | 5/6 | 1/6 | $Rc_4 = 5/6 \times R_6 + 1/6 \times R_2$ | 7/12 | 5/12 | $Gc_4 = 7/12 \times G_7 + 5/12 \times G_3$ |
| $R_{2+}$ | $G_{1+}$ | $R_{0+}$ | $G_7$ | $R_6$ | $G_3$ | 2 | $G_7$ | $G_3$ | 11/12 | 1/12 | $Gc_5 = 11/12 \times G_7 + 1/12 \times G_3$ | 1/3 | 2/3 | $Rc_5 = 1/3 \times R_{0+} + 2/3 \times R_6$ |
| $G_{3+}$ | $R_{2+}$ | $G_{1+}$ | $R_{0+}$ | $G_7$ | $R_6$ | 2 | $R_{0+}$ | $R_6$ | 1 | 0 | $Rc_{0+} = 1 \times R_{0+} + 0 \times R_6$ | 1/2 | 1/2 | $Gc_{0+} = 1/2 \times G_{1+} + 1/2 \times G_7$ |
| $R_{6+}$ | $G_{3+}$ | $R_{2+}$ | $G_{1+}$ | $R_{0+}$ | $G_7$ | 1 | $G_{3+}$ | $G_{1+}$ | 1/6 | 5/6 | $Gc_{1+} = 1/6 \times G_{3+} + 5/6 \times G_{1+}$ | 2/3 | 1/3 | $Rc_{1+} = 2/3 \times R_{2+} + 1/3 \times R_{0+}$ |
| $G_{7+}$ | $R_{6+}$ | $G_{3+}$ | $R_{2+}$ | $G_{1+}$ | $R_{0+}$ | 1 | $R_{6+}$ | $R_{2+}$ | 1/6 | 5/6 | $Rc_{2+} = 1/6 \times$ | 5/6 | 1/6 | $Gc_{2+} = 5/6 \times$ |

TABLE 1-continued

| | | | | | | Selector Output | | | | Output from multiplier 641 | k2 | k1 | Output from multiplier 642 |
|---|---|---|---|---|---|---|---|---|---|---|---|---|---|
| S5 | S4 | S3 | S2 | S1 | State | 622 | 621 | K4 | K3 | | | | |
| $R_{0++}$ | $G_{7+}$ | $R_{6+}$ | $G_{3+}$ | $R_{2+}$ | $G_{1+}$ | 1 | $G_{7+}$ | $G_{3+}$ | 3/4 | 1/4 | $R_{6+} + 5/6 \times R_{2+}$ $Gc_{3+} = 3/4 \times G_{7+} + 1/4 \times G_{3+}$ | 1/2 | 1/2 | $G_{3+} + 1/6 \times G_{1+}$ $Rc_{3+} = 1/2 \times R_{6+} + 1/2 \times R_{2+}$ |
| $G_{1++}$ | $R_{0++}$ | $G_{7+}$ | $R_{6+}$ | $G_{3+}$ | $R_{2+}$ | 2 | $R_{6+}$ | $R_{2+}$ | 5/6 | 1/6 | $Rc_{4+} = 5/6 \times R_{6+} + 1/6 \times R_{2+}$ | 7/12 | 5/12 | $Gc_{4+} = 7/12 \times G_{7+} + 5/12 \times G_{3+}$ |
| $R_{2++}$ | $G_{1++}$ | $R_{0++}$ | $G_{7+}$ | $R_{6+}$ | $G_{3+}$ | 2 | $G_{7+}$ | $G_{3+}$ | 11/12 | 1/12 | $Gc_{5+} = 11/12 \times G_{7+} + 1/12 \times G_{3+}$ | 1/3 | 2/3 | $Rc_{5+} = 1/3 \times R_{0++} + 2/3 \times R_{6+}$ |

As described above, thinning-out readout operation may be performed at uneven intervals. In this case, addition coefficients (k1, k2, k3, and k4) and selector states (in1 and in2) based on the consideration of distortion correction for read operation performed at uneven intervals are recorded on a lookup table, and distortion correction and color interpolation processing is sequentially performed.

In the processing represented by equation (6), distortion correction and color interpolation are performed for R- and B-channels data interpolated on each line in the vertical direction. It suffices to form an arrangement for this processing by adding a line memory to an arrangement like that shown in FIGS. 8 to 13 so as to perform interpolation processing in the vertical direction.

Figure 14:
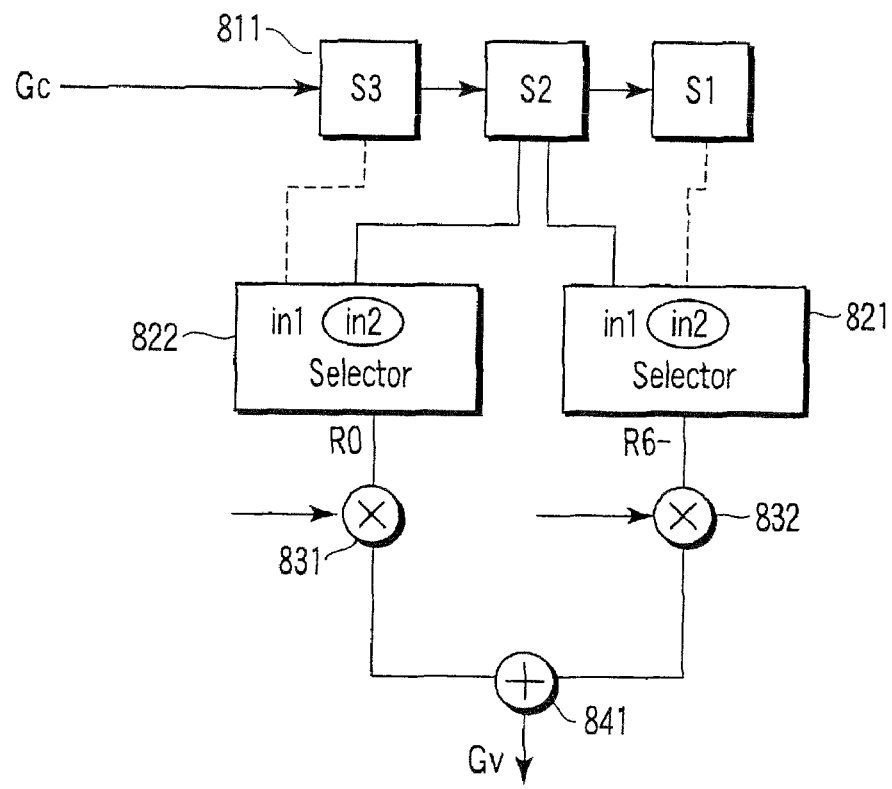
FIG. 14 schematically shows the arrangement of a pipeline which executes interpolation in the vertical direction of a G channel.

For G-channel interpolation in the vertical direction shown in equation (5), the pipeline shown in FIG. 14 is used. This pipeline includes a 3-tap shift register 811, a selector 822 to which data from the first and second registers of the shift register 811 are input, a selector 821 to which data from the second and third registers of the shift register 811 are input, a multiplier 831 which multiplies output data from the selector 822 by a predetermined coefficient, a multiplier 832 which multiplies output data from the selector 821 by a predetermined coefficient, and an adder 841 which adds output data from the multiplier 831 to output data from the multiplier 832.

The difference between this embodiment in which distortion correction and color interpolation processing are simultaneously performed and a case wherein these processes are separately performed will be described below.

In contrast to this embodiment in which distortion correction and color interpolation are simultaneously performed, in the processing in which distortion correction is performed first to generate data in an equidistant Bayer pattern, and then color interpolation is performed, interpolation processing for distortion correction and interpolation processing for color interpolation are separately performed.

Figure 15:
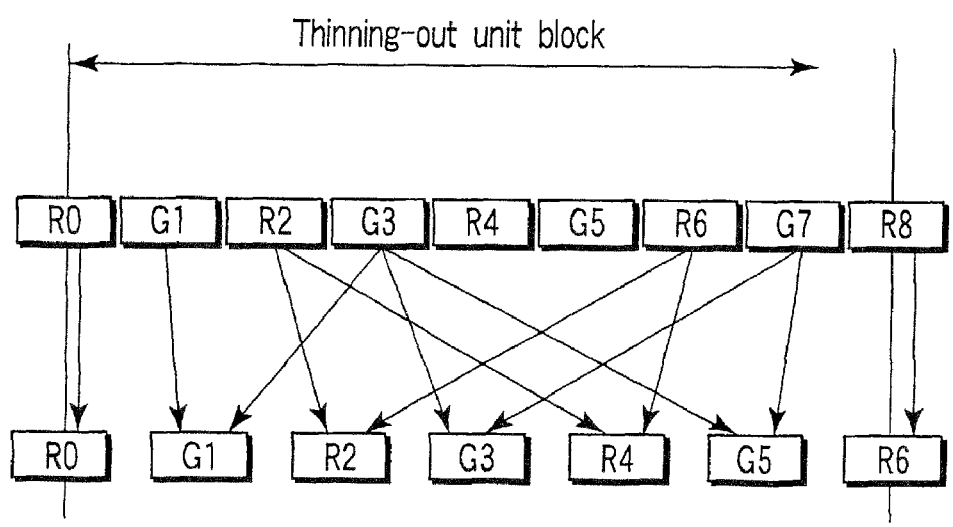
FIG. 15 schematically shows how data in an equidistant Bayer pattern are generated by performing only distortion correction processing in the horizontal direction of an RG line.

FIG. 15 schematically shows how data in an equidistant Bayer pattern are generated by performing only distortion correction processing in the horizontal direction of an RG line. Such transformation is expressed in a matrix notation like equation (4) as follows:

$$\begin{pmatrix} Rc_0 \\ Gc_1 \\ Rc_2 \\ Gc_3 \\ Rc_4 \\ Gc_5 \end{pmatrix} = \begin{pmatrix} 1 & 0 & 0 & 0 & 0 & 0 \\ 0 & \frac{5}{6} & 0 & \frac{1}{6} & 0 & 0 \\ 0 & 0 & \frac{5}{6} & 0 & \frac{1}{6} & 0 \\ 0 & 0 & 0 & \frac{3}{4} & 0 & \frac{1}{4} \\ 0 & 0 & \frac{1}{6} & 0 & \frac{5}{6} & 0 \\ 0 & 0 & 0 & \frac{1}{12} & 0 & \frac{11}{12} \end{pmatrix} \begin{pmatrix} R_0 \\ G_1 \\ R_2 \\ G_3 \\ R_6 \\ G_7 \end{pmatrix}. \quad (7)$$

If linear interpolation is used for full color processing of image data in a Bayer pattern, a signal G at the position of $Rc_2$ is given by $(Gc_1+Gc_2)/2$. This data can be expressed as follows by using readout original signals $G_1$, $G_3$, and $G_7$:

$$\frac{(Gc_1 + Gc_3)}{2} = \frac{1}{2}\left(\frac{5}{6}G_1 + \frac{1}{6}G_3\right) + \frac{1}{2}\left(\frac{3}{4}G_3 + \frac{1}{4}G_7\right) \quad (8)$$

$$= \frac{10}{24}G_1 + \frac{11}{24}G_3 + \frac{3}{24}G_7.$$

Such two processes, i.e., distortion processing and full color processing, are expressed by a matrix as follows:

$$\begin{pmatrix} Rc_0 \\ Gc_0 \\ Rc_1 \\ Gc_1 \\ Rc_2 \\ Gc_2 \\ Rc_3 \\ Gc_3 \\ Rc_4 \\ Gc_4 \\ Rc_5 \\ Gc_5 \end{pmatrix} = \begin{pmatrix} 0 & 1 & 0 & 0 & 0 & 0 & 0 & 0 \\ \frac{1}{2} & 0 & \frac{1}{2} & 0 & 0 & 0 & 0 & 0 \\ 0 & \frac{1}{2} & 0 & \frac{1}{2} & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & \frac{1}{2} & 0 & \frac{1}{2} & 0 & 0 & 0 \\ 0 & 0 & 0 & \frac{1}{2} & 0 & \frac{1}{2} & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & \frac{1}{2} & 0 & \frac{1}{2} & 0 \\ 0 & 0 & 0 & 0 & 0 & \frac{1}{2} & 0 & \frac{1}{2} \\ 0 & 0 & 0 & 0 & 0 & 0 & 1 & 0 \end{pmatrix}. \quad (9)$$

-continued $$\begin{pmatrix} \frac{1}{12} & 0 & \frac{11}{12} & 0 & 0 & 0 & 0 & 0 & 0 & 0 \\ 0 & 0 & 0 & 1 & 0 & 0 & 0 & 0 & 0 & 0 \\ 0 & 0 & 0 & 0 & \frac{5}{6} & 0 & \frac{1}{6} & 0 & 0 & 0 \\ 0 & 0 & 0 & 0 & 0 & \frac{5}{6} & 0 & \frac{1}{6} & 0 & 0 \\ 0 & 0 & 0 & 0 & 0 & 0 & 0 & 0 & \frac{1}{4} & 0 \\ 0 & 0 & 0 & 0 & 0 & \frac{1}{6} & 0 & \frac{5}{6} & 0 & 0 \\ 0 & 0 & 0 & 0 & 0 & 0 & \frac{1}{12} & 0 & \frac{11}{12} & 0 \\ 0 & 0 & 0 & 0 & 0 & 0 & 0 & 0 & 0 & 1 \end{pmatrix} \cdot \begin{pmatrix} G_{-3} \\ R_{-2} \\ G_{-1} \\ R_0 \\ G_1 \\ R_2 \\ G_3 \\ R_6 \\ G_7 \\ R_8 \end{pmatrix}.$$

Equation (9) is expressed by equation (10) given below by calculating the product of the matrix:

$$\begin{pmatrix} Rc_0 \\ Gc_0 \\ Rc_1 \\ Gc_1 \\ Rc_2 \\ Gc_2 \\ Rc_3 \\ Gc_3 \\ Rc_4 \\ Gc_4 \\ Rc_5 \\ Gc_5 \end{pmatrix} = \begin{pmatrix} 0 & 0 & 0 & 1 & 0 & 0 & 0 & 0 & 0 & 0 \\ \frac{1}{24} & 0 & \frac{11}{24} & 0 & \frac{5}{12} & 0 & \frac{1}{12} & 0 & 0 & 0 \\ 0 & 0 & 0 & \frac{1}{2} & 0 & \frac{5}{12} & 0 & \frac{1}{12} & 0 & 0 \\ 0 & 0 & 0 & 0 & \frac{5}{6} & 0 & \frac{1}{6} & 0 & 0 & 0 \\ 0 & 0 & 0 & 0 & 0 & \frac{3}{4} & 0 & \frac{1}{4} & 0 & 0 \\ 0 & 0 & 0 & 0 & \frac{10}{24} & 0 & \frac{11}{24} & 0 & \frac{1}{8} & 0 \\ 0 & 0 & 0 & 0 & 0 & \frac{1}{2} & 0 & \frac{1}{2} & 0 & 0 \\ 0 & 0 & 0 & 0 & 0 & 0 & \frac{3}{4} & 0 & \frac{1}{4} & 0 \\ 0 & 0 & 0 & 0 & 0 & \frac{1}{6} & 0 & \frac{5}{6} & 0 & 0 \\ 0 & 0 & 0 & 0 & 0 & 0 & \frac{5}{12} & 0 & \frac{7}{12} & 0 \\ 0 & 0 & 0 & 0 & 0 & 0 & \frac{1}{12} & 0 & \frac{5}{12} & 0 & \frac{1}{2} \\ 0 & 0 & 0 & 0 & 0 & 0 & \frac{1}{12} & 0 & \frac{11}{12} & 0 \end{pmatrix} \cdot \begin{pmatrix} G_{-3} \\ R_{-2} \\ G_{-1} \\ R_0 \\ G_1 \\ R_2 \\ G_3 \\ R_6 \\ G_7 \\ R_8 \end{pmatrix}. \quad (10)$$

Equation (4) indicates a case wherein distortion correction processing and color interpolation processing are simultaneously performed. Equation (10) indicates a case wherein distortion correction processing and color interpolation processing are separately performed. Coefficients corresponding to one line of a matrix are weighting coefficients for linear interpolation for the generation of one corresponding pixel data. The wider the range of coefficients, the larger the contribution to separate pixels. This therefore indicates the presence of a spatial band loss. It is obvious that since the range of coefficient in equation (4) is narrower than that in equation (10), the band loss during the time until color interpolation is smaller.

As described above, a high-resolution image can be obtained by simultaneously performing distortion correction and full color processing in consideration of the positions of pixels subjected to color interpolation and full color processing and the positions of sampled pixels.

Third Embodiment

Figure 16:
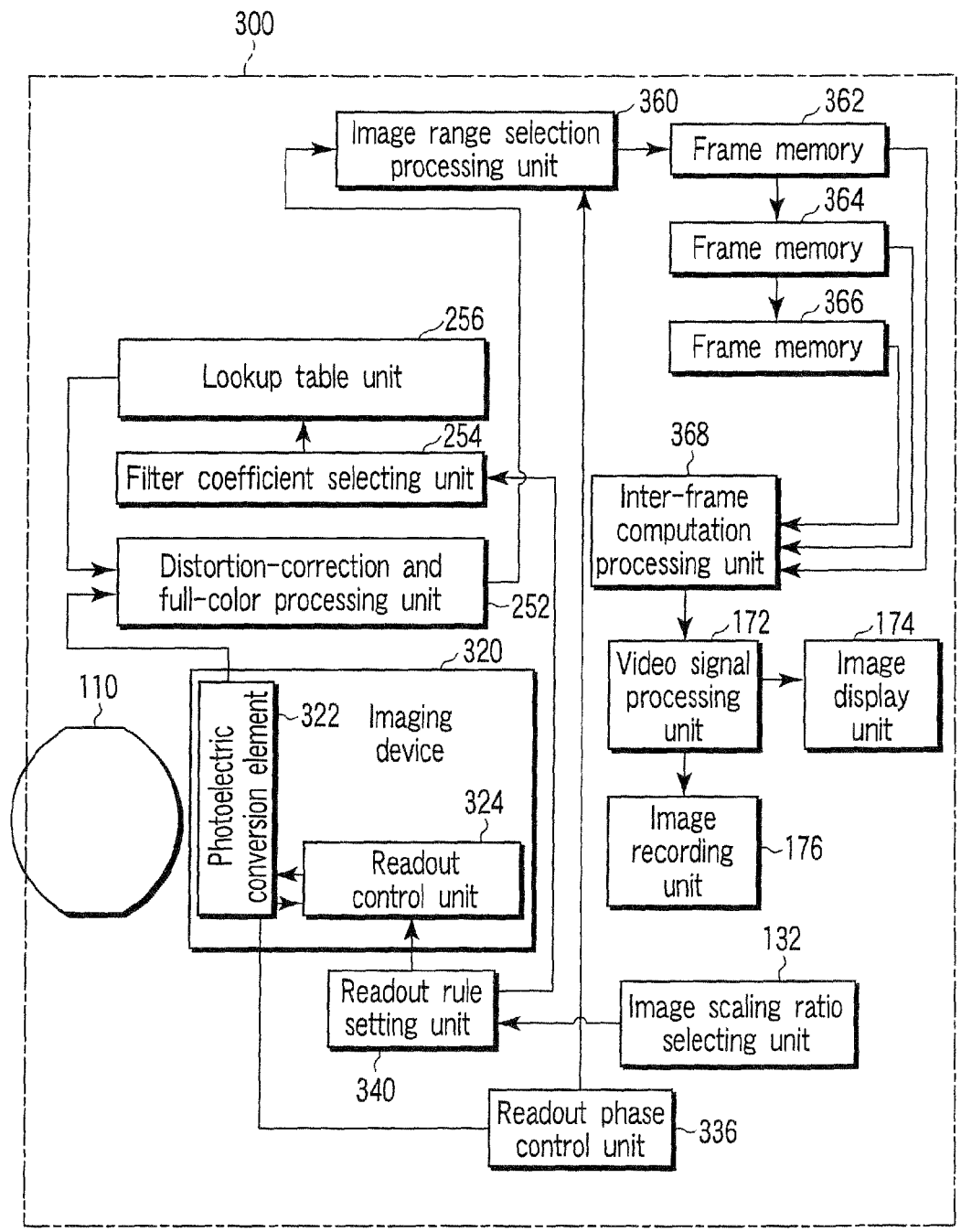
FIG. 16 shows the arrangement of an imaging apparatus according to the third embodiment of the present invention.

This embodiment is directed to another imaging apparatus suitable for moving image photography. FIG. 16 shows the arrangement of an imaging apparatus according to the third embodiment of the present invention. The elements denoted by the same reference numerals as those of the imaging apparatus 200 according to the second embodiment are identical to those in FIG. 16, and a detailed description thereof will be omitted to avoid repetition in the following description.

An imaging apparatus 300 according to this embodiment includes an image forming optical system 110 which forms an optical image of an object, and an imaging device 320 which continuously outputs an image signal of a predetermined area of the optical image formed by the image forming optical system 110. That is, the image signal output from the imaging device 320 is a moving image signal, which comprises the image data of time-serially consecutive frames.

The imaging device 320 includes an area-like photoelectric conversion element 322 which acquires digital image data (a set of image data) by photoelectrically converting the optical image formed by the image forming optical system 110, and a readout control unit 324 which continuously reads out the image data acquired by the photoelectric conversion element 322 upon thinning out pixels as needed. The photoelectric conversion element 322 has a color filter array with a Bayer pattern, and acquires the RGB data of the optical image formed by the image forming optical system 110.

The imaging apparatus 300 further includes an image scaling ratio selecting unit 132 which selects a scaling ratio for an image to be output, a readout rule setting unit 340 which sets a pixel thinning-out readout rule for the readout control unit 324, and a distortion-correction and full-color processing unit 252 which performs distortion correction and full color processing for the image data read out from the imaging device 320. The details of the distortion-correction and full-color processing unit 252 are the same as those in the second embodiment.

The imaging apparatus 300 further includes a readout phase control unit 336 which changes the reference position of the range (readout range) of image data read out from the photoelectric conversion element 322 by the readout control unit 324 for each frame, and an image range selection processing unit 360 which selects a range common to all the frames of image data output from the distortion-correction and full-color processing unit 252 on the basis of the reference position of the readout range set for each frame by the readout phase control unit 336.

The readout phase control unit 336 changes the reference position of the readout range for each frame, and the image range selection processing unit 360 selects a range common to all the frames. In accordance with this operation, the readout rule setting unit 340 sets a pixel thinning-out readout rule to make the readout control unit 324 read out image data throughout a range wider than the image area set by the image scaling ratio selecting unit 132.

The readout control unit 324 in the imaging device 320 continuously reads out image data (1-frame pixel data) in a corresponding range in the pixel array in the photoelectric conversion element 322 on the basis of the readout rule set by the readout rule setting unit 340 and the reference position of the readout range set by the readout phase control unit 336. As a result, the imaging device 320 outputs a moving image signal comprising the image data of time-serially consecutive frames.

The imaging apparatus 300 further includes three cyclic frame memories 362, 364, and 366 which temporarily store the image data of frames, and an inter-frame computation processing unit 368 which generates new image data by performing computation processing for the image data of frames stored in the frame memories 362, 364, and 366.

In moving image photography in a conventional video system, an interlaced scanning system in which two fields constitute one frame is often used. At a general frame rate of 1/30, image flickering due to interlaced scanning is not noticeable. Interlaced scanning, rather, makes it possible to obtain image information in a wider area than all point scanning within the same time and obtain high-resolution image at high speed by interpolation between fields.

In this embodiment, omitted pixel data are interpolated between two consecutive frames in the same manner that interlaced scanning interpolates omitted pixel data between two fields.

As an interpolation technique, changing a thinning-out position for each frame may be taken into consideration. For example, in 75% reduction processing, as shown in FIG. 5, six pixels are read out from eight pixels. In this case, a smooth image can be obtained by changing the readout position for six pixels between frames and performing addition processing between the frames after distortion correction and full color processing for each frame. Changing the readout rule for each frame in this manner is effective. However, since different readout rules are set for the respective frames, different coefficients for distortion correction processing must be set for the respective frames. This will lead to an increase in hardware size.

Another technique that can obtain a similar effect may be to set the same readout rule for all frames but shift a readout range between two consecutive frames. The imaging apparatus 300 according to this embodiment interpolates omitted pixel data between two consecutive frames in accordance with this technique.

For this purpose, the readout phase control unit 336 changes, for each frame, the reference position of the range (readout range) of pixel data read out from the photoelectric conversion element 322 by the readout control unit 324 upon thinning out. More specifically, the readout phase control unit 336 changes the reference position of the readout range for each frame periodically in accordance with a predetermined rule.

For example, the readout phase control unit 336 shifts the reference position of the range of pixel data read out by the readout control unit 324 such that the image data of consecutive frames do not have omitted pixel data as a whole. More preferably, the readout phase control unit 336 shifts the reference position of the readout range such that the image data of two consecutive frames do not commonly have omitted pixel data. The shift amount is preferably about four to eight pixels.

As a consequence, pixel data at a specific position in the photoelectric conversion element 322 which is omitted when thinning-out readout is performed with respect to the image data of a specific frame is included in the image data of another frame. That is, pixel data at a specific position in the photoelectric conversion element 322 can be prevented from being always omitted from the image signal output from the imaging device 320.

The inter-frame computation processing unit 368 further performs processing of interpolating omitted pixel data with respect to the image data of consecutive frames stored in the frame memories 362, 364, and 366. For example, addition of ½:½ is performed with respect to the image data of two consecutive frames. Alternatively, addition of ¼:½:¼ is performed with respect to the image data of three consecutive image data.

Figures 17, 18:
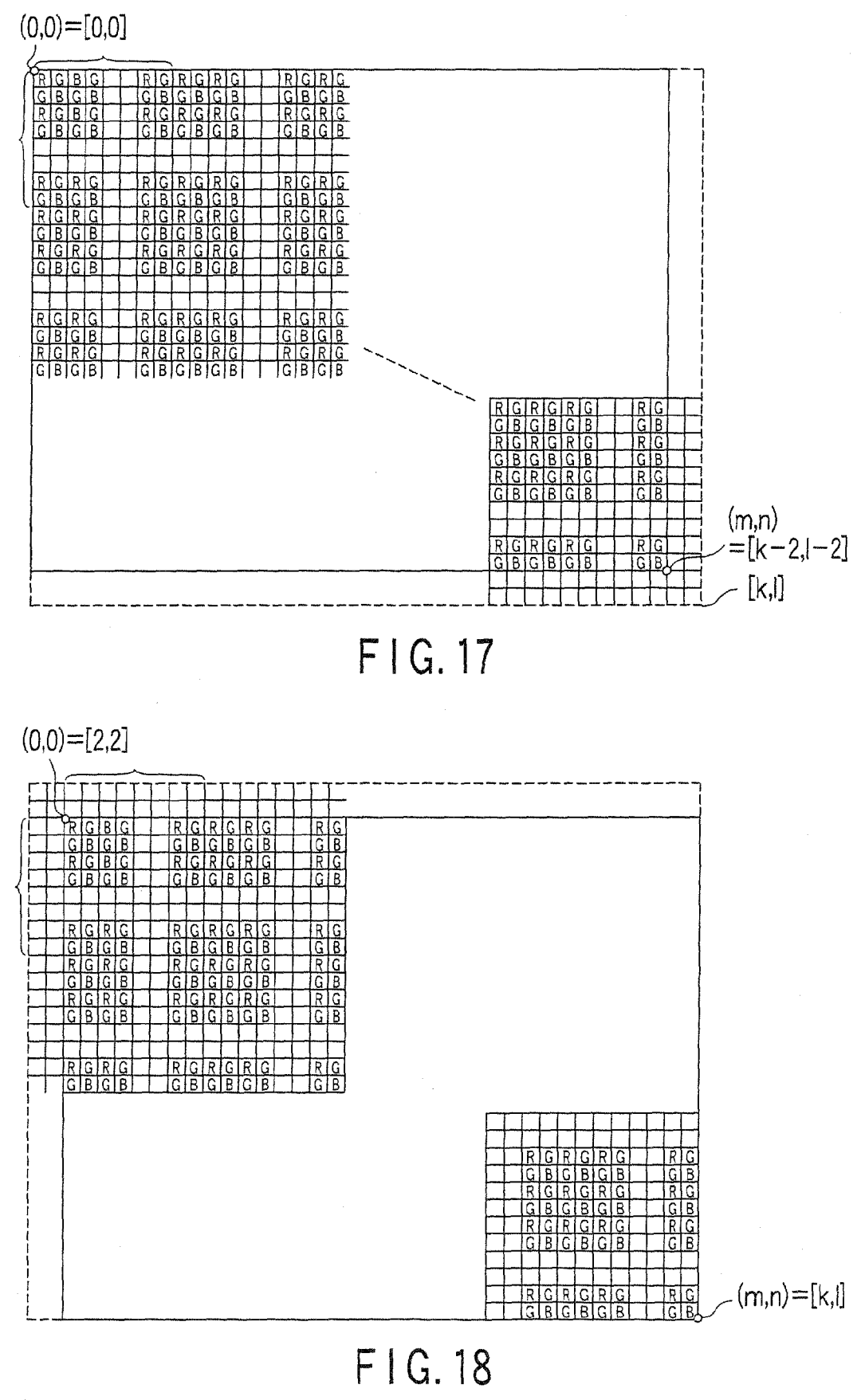

FIGS. 17 and 18 schematically show how the reference position of a readout range is shifted in readout operation by repetitive 6/8 thinning-out readout operation. Referring to FIGS. 17 and 18, [x, y] represents a pixel position in the pixel array of the photoelectric conversion element 322, and (x, y) represents a pixel data array in the readout range.

In this case, FIG. 17 shows one (to be referred to as a frame A hereinafter) of two temporally adjacent frames, and FIG. 18 shows the other frame (to be referred to as a frame B hereinafter).

As shown in FIGS. 17 and 18, the pixel count of the photoelectric conversion element 322 is given by k pixels in the horizontal direction and l pixels in the vertical direction. Therefore, the position of the upper left pixel in the photoelectric conversion element 322 is represented by [0, 0], and the position of the lower right pixel is represented by [k, l]. In addition, the pixel count of the readout range of one frame is given by m pixels in the horizontal direction and n pixels in the vertical direction. Therefore, the upper left readout start position in the frame is represented by (0, 0), and the lower right readout end position is represented by (m, n). The readout range of the frame B in FIG. 18 is shifted from the readout range of the frame A in FIG. 17 by +2 pixels in the horizontal direction and +2 pixels in the vertical direction.

In the frame A in FIG. 17, the upper left readout start position (0, 0) coincides with the upper left pixel position [0, 0] in the photoelectric conversion element 322. That is, (0, 0)=[0, 0]. In addition, the readout end position (m, n) is given by (m, n)=[k−2, l−2]. In the frame shown in FIG. 18, the upper left readout start position is represented by (0, 0)=[2, 2]. The readout end position is represented by (m, n)=[k, l].

The image range selection processing unit 360 selects a range common to the frame A in FIG. 17 and the frame B in FIG. 18. That is, the image range selection processing unit 360 selects a rectangular range whose diagonal vertices are given by (2, 2) and (m, n) with respect to the frame A in FIG. 17, and selects a rectangular range whose diagonal vertices are given by (0, 0) and (m−2, n−2) with respect to the frame B in FIG. 18. The range selected by the image range selection processing unit 360 always has (m−2)×(n−2) pixel data.

When, for example, an image with a VGA (640×480) size is to be generated in a case wherein the shift amount between frames is four pixels, it suffices to acquire image data in an area of 644×484 pixels while shifting the area by four pixels alternately between frames.

The imaging apparatus of this embodiment has the same merit as that of the imaging apparatus of the second embodiment. In addition to this, the imaging apparatus of this embodiment prevents the omission of pixel data at a specific position in the photoelectric conversion element by reading out image data while changing the readout rule for each frame in moving image photography. With these merits, the imaging apparatus of this embodiment can form a high-resolution moving image with little distortion.

Fourth Embodiment

Figure 19:
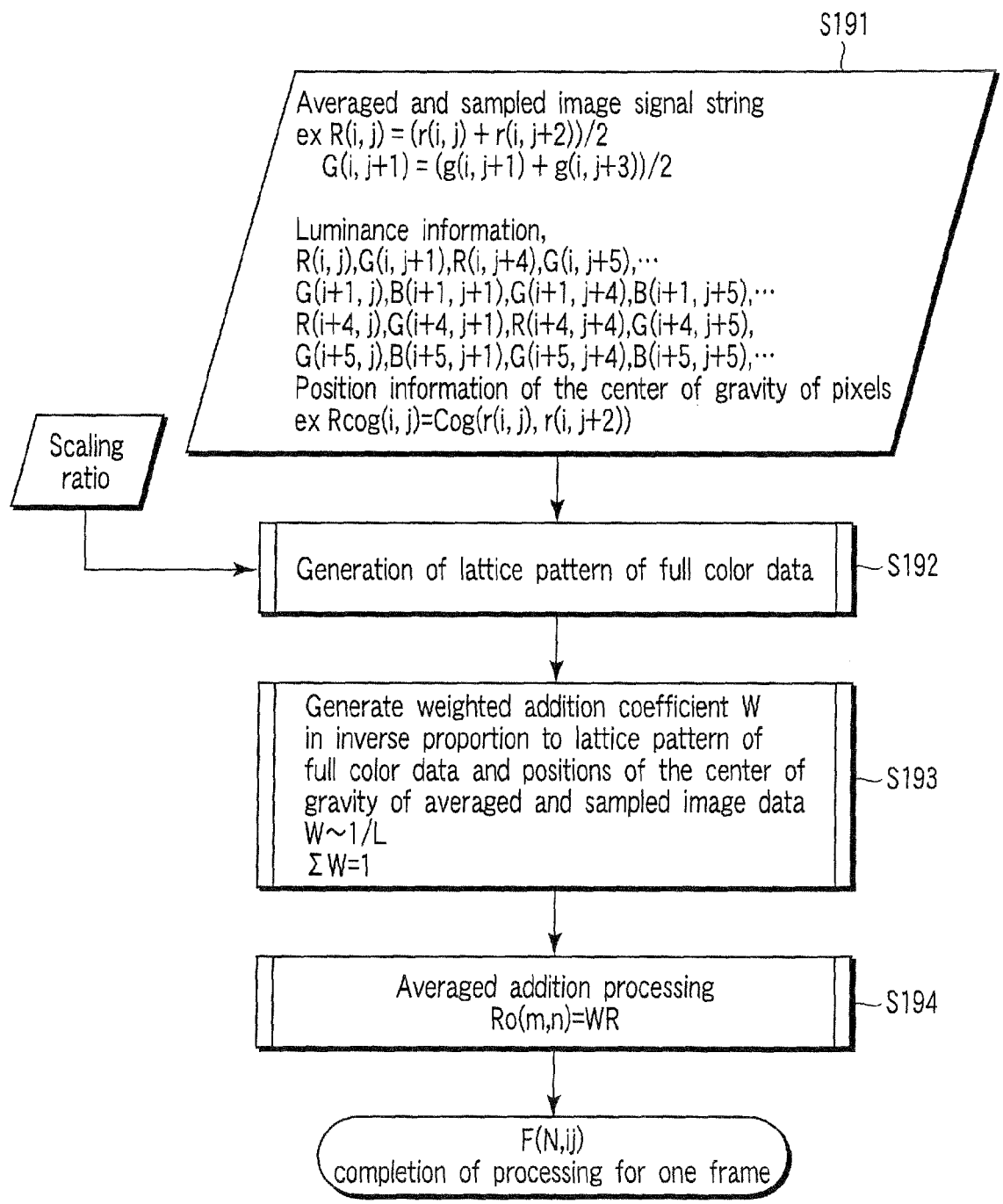
FIG. 19 shows a method of transforming data obtained by averaged sampling into image data corresponding to a scaling ratio.

This embodiment is directed to a method of transforming data obtained by averaged sampling into image data corresponding to a scaling ratio. FIG. 19 shows a sequence for the method of transforming data obtained by averaged sampling into image data corresponding to a scaling ratio. The original image data is assumed to be data in a Bayer pattern. In step S191, two horizontal pixels are added and averaged to be assigned to one pixel.

$$R(i, j) = \frac{(r(i, j) + r(i, j+2))}{2} \tag{11}$$

-continued
$$G(i, j+1) = \frac{(g(i, j+1) + g(i, j+3))}{2}$$

where R represents image data after averaging processing, and r represents the original pixel data. In the above case, indices are used as follows to explicitly indicate pixel positions after averaging processing:

$$R(i, j), G(i, j+1), R(i, j+4), G(i, j+5), \ldots \quad (12)$$
$$G(i+1, j), B(i+1, j+1), G(i+1, j+4), B(i+1, j+5), \ldots$$
$$R(i+4, j), B(i+4, j+1), G(i+4, j+4), B(i+4, j+5), \ldots$$
$$G(i+5, j), B(i+5, j+1), G(i+5, j+4), B(i+5, j+5), \ldots.$$

In this case, in consideration of the sampling position of the original data represented by equations (11), the position of the center of gravity of a pixel is expressed as follows:

$$R_{cog}(i,j) = \mathrm{Cog}(r(i,j), r(i,j+2)) \quad (13)$$

where $R_{cog}(i, j)$ represents the position of the center of gravity of a pixel $R(i, j)$, and $\mathrm{Cog}(X, Y)$ represents an operator for calculating the centers of gravity of X and Y. The actual position may be obtained from the index (i, j+1) in consideration of the pitch of the actual pixel array. In addition, averaging processing to be performed is not limited to horizontal two-pixel averaging processing represented by equations (11), and horizontal, vertical averaging processing may be performed.

In step S192, the lattice positions of the full color data are calculated in accordance with a scaling ratio. As shown in FIG. 2, the lattice positions of the full color data have a relative relationship with the sampling positions of the original data, and a distance L between the lattice of the full color data of the output image and pixel data used for weighted averaging can be calculated. In step S193, weighting coefficients W are inversely proportional to the distance L, and calculation is performed such that the sum total of weighted averages becomes 1.

Weighted addition processing for calculating output image data can be represented in a matrix form as follows:

$$RO = W \cdot R \quad (14)$$

where W is a weighted addition coefficient, and R is the matrix of pixel data. When image data in a Bayer pattern is assumed to be used, since the positions of the center of gravity are different from each other, as indicated by equation (11), when averaged sampling is performed by using R, G, and B channels, respectively, the weighted addition coefficients in equation (13) are different between the channels.

Fifth Embodiment

This embodiment is directed to an imaging apparatus which performs thinning-out processing in advance in accordance with the scaling ratio of the image size as needed, and then performs distortion correction and full color processing. FIGS. 20 to 25 show sequences for performing thinning-out processing in accordance with the scaling ratio of the image size (pixel count) and then performing distortion correction and full color processing when given image data (Bayer pattern) is to be transformed into full color image data with a different size.

Figure 20:
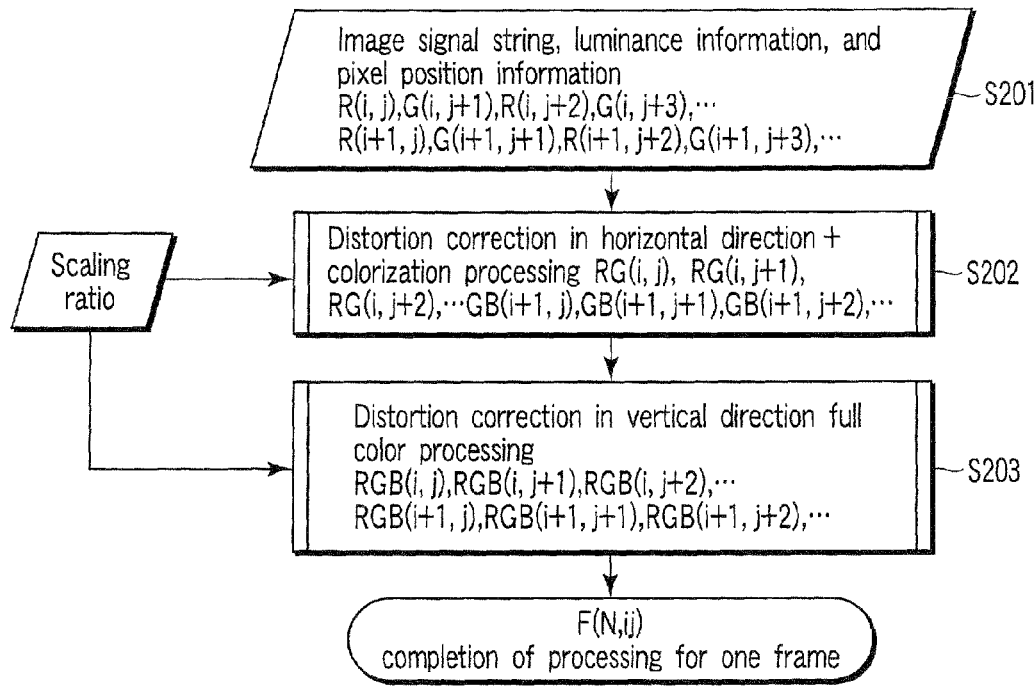
FIG. 20 shows the flow of processing in which after distortion correction and full color processing are performed for data obtained by thinning-out sampling, and the resultant data is transformed into image data corresponding to a scaling ratio.

FIG. 20 shows the overall flow of processing. In step S202, distortion correction processing in the horizontal direction and 2-channel colorization processing are performed in accordance with input image data (after thinning-out processing) and a scaling ratio. In step S203, processing in the vertical direction and full color processing are performed. 2-channel colorization processing is performed as follows. In the case of a Bayer pattern, for example, there are a line on which R, G, R, G are aligned and a line on which G, B, G, B are aligned in the horizontal direction. In processing for an RG line in the horizontal direction, as shown in FIGS. 6 to 13, two channel data, i.e., R- and G-channel data, are generated at the same pixel position. In step S202 in FIG. 20, PG(i, j) corresponds to a state wherein there are two channels, i.e., R and G channels, at the same pixel position. For example, an output R from the adder 641 and an output G from the adder 642 in FIG. 8 are collectively represented as RG(ij).

After a line count (line buffer) that enables interpolation processing in the vertical direction is ensured, interpolation in the vertical direction and full color processing are performed from the data having undergone interpolation processing in the horizontal direction in step S203. If a Bayer pattern is assumed, the luminance data of G channels at all positions can be obtained by interpolation processing in the horizontal direction. As shown in FIG. 7, therefore, processing in the vertical direction is performed by using different coefficients for the R and B channels and the G channel.

Figure 21:
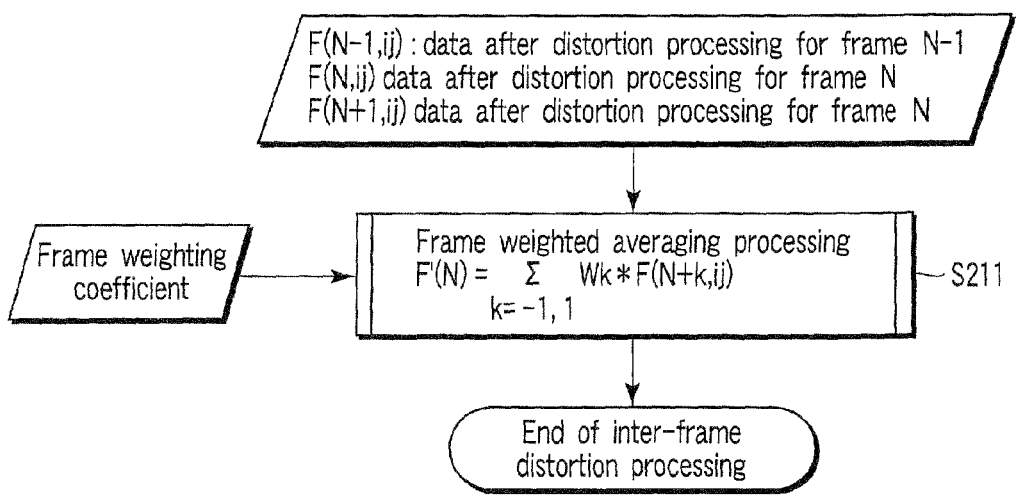
FIG. 21 shows interpolation processing between consecutive frames.

If image data are those of consecutive frames, interpolation processing is performed first in the respective frames, and inter-frame interpolation processing is then performed in step S211 in FIG. 21. This makes it possible to further reduce distortion.

Figure 22:
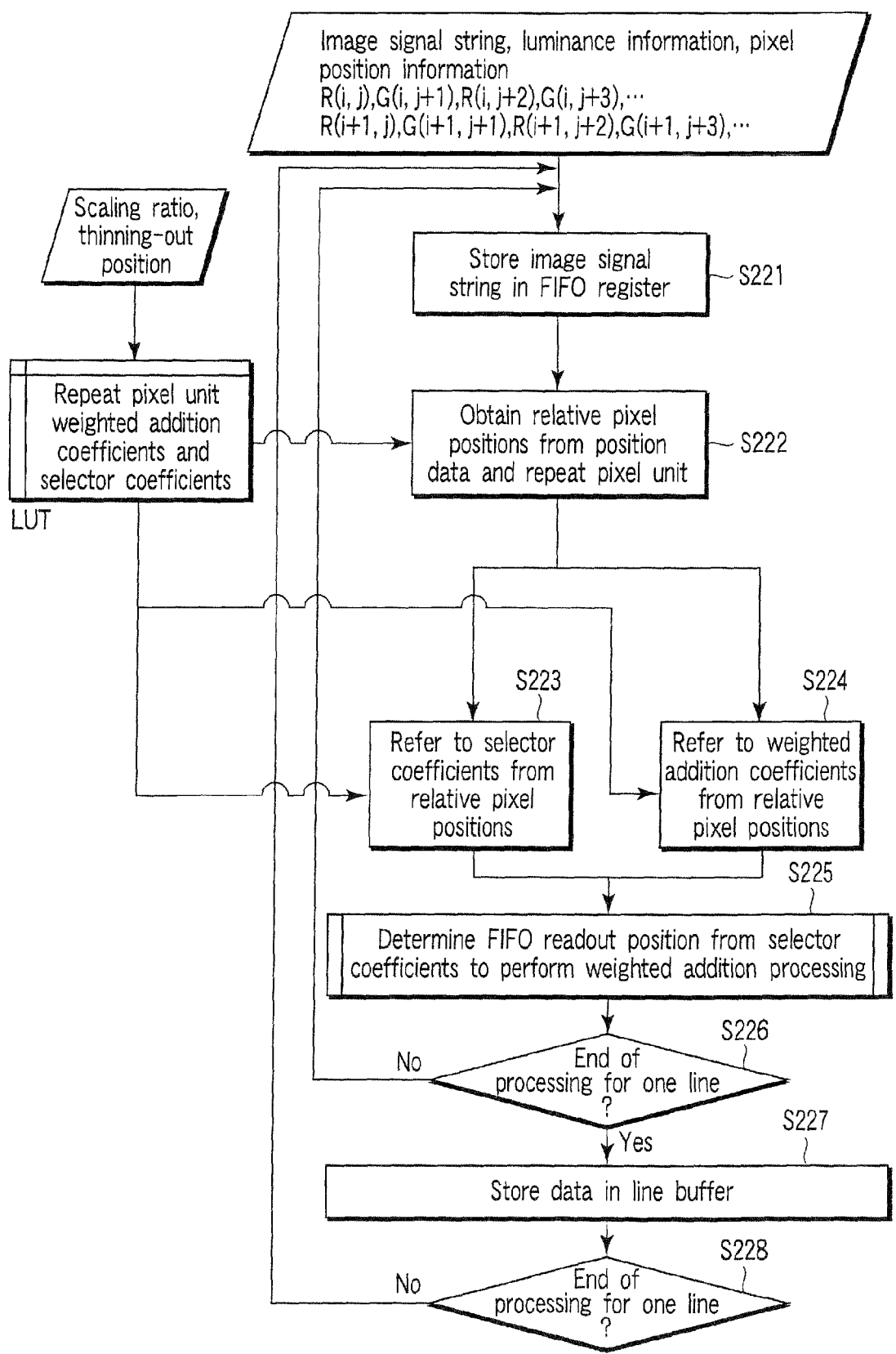
FIG. 22 shows the details of distortion correction in the horizontal direction and colorization processing in the flow in FIG. 20.

The details of the processing in FIG. 20 will be described. FIG. 22 shows the details of distortion correction in the horizontal direction and colorization processing.

In step S221, image data which are consecutive in the horizontal direction are stored in a FIFO (First In First Out) register. This register corresponds to the 5-tap register shown in FIGS. 8 to 13. Input image data has undergone thinning-out processing, and has luminance data and pixel position data. An LUT indicates a repetitive pixel count for interpolation processing, weighted addition coefficients, and selector positions which are determined in accordance with a scaling ratio. See FIGS. 8 to 13 for the operations of the selectors. The repeat pixel unit is the same as that shown in FIGS. 5 and 6.

In step S222, the relative positions of pixels are obtained from the position data of the input image and the repeat pixel unit. This is equivalent to expressing consecutive pixel data by repetition of six pixels, as shown in FIGS. 8 to 13. The repeat pixel unit is equivalent to the intervals of pixels using the same interpolation coefficients and selector states when interpolation processing for scaling is performed. As shown in FIGS. 8 to 13, selector states can be obtained from the repetition pixel unit and the pixel position of the input image. In this case, in order to reduce the load on computation for scaling processing, there is provided an arrangement designed to allow reference to repeat pixel units, weighted addition coefficients, and selector states, which are calculated in advance, through an LUT.

FIG. 24 shows a sequence for calculating the contents of such an LUT. Since a scaling ratio, a repeat unit, and selector states are obtained from a scaling ratio, a pixel thinning-out position, and a periodic pixel thinning-out position, weighted addition coefficients like those represented by equation (4) can be obtained.

In step S223, selector coefficients (states) are referred from the relative pixel positions obtained in step S222. In step S224, weighting coefficients are referred from the relative pixel positions. In step S225, the readout position of the register held in step S221 is determined from the selector coefficients obtained in this manner, weighted addition processing is performed by using the weighed addition coefficients obtained in step S224.

In step S226, if the processing for one line is terminated in the branch based on the end condition for the loop for one line, data is stored in the line buffer, and the interpolation in the horizontal direction and the full color processing shown in FIG. 23 by using the data stored in the line buffer.

FIG. 23 shows the details of distortion correction processing in the vertical direction. In step S231, image data which are consecutive in the vertical direction are stored in the vertical shift register. In step S232, relative pixel positions are obtained from the position data of the input image and the repeat pixel unit. In step S233, it is determined whether it is a G channel or an R or B channel. As indicated by FIG. 7 and equation (7), in the vertical direction, different interpolation coefficients are used for the G channel and the R and B channels. For this reason, referring to FIG. 23, different weighted addition coefficients are referred for the G channel and the R and B channels. If it is an R or B channel, weighted addition coefficients for the R and B channels are referred to in step S235. If it is a G channel, weighted addition coefficients for the G channel are referred to in step S236. Other processes are the same as those in FIG. 22.

FIG. 25 shows a procedure for calculation of the contents of the LUT in FIG. 23.

Although the embodiments of the present invention have been described with reference to the drawings, the present invention is not limited to the embodiments. Various changes and modifications can be made within the spirit and scope of the invention.

What is claimed is:

1. An imaging apparatus comprising: an imaging element which is equipped with a color filter array with different spectral transmittances and which photoelectrically converts an image formed by an optical system to acquire photoelectrically converted signals, wherein image data including pixel data of an image to be output is obtained from the photoelectrically converted signals;
   an image scaling ratio selecting unit which selects an image scaling ratio for the image to be output from the imaging element;
   a readout rule setting unit which sets a readout rule for the pixel data of the image to be output in accordance with the selected image scaling ratio;
   a readout control unit which reads out thinned-out pixel data from the imaging element in accordance with the set readout rule; and
   a full color data generator which generates full color data from the read out thinned-out pixel data by obtaining weighting coefficients for generation of each color component of the full color data based on an inverse proportional relationship of a distance between positions of each pixel in a lattice pattern of the full color data to be generated and positions of a center of gravity of the corresponding pixels in the read out thinned-out pixel data.

2. The imaging apparatus according to claim 1, wherein the image data acquired by the imaging element includes pixel data of time-serially consecutive frames.

3. The imaging apparatus according to claim 2, further comprising:
   a readout phase control unit which changes a reference position of a readout range of the pixel data of each frame; and
   an image range selection processing unit which selects a range common to all frames of full color data generated from the read out thinned-out pixel data by the full color data generator based on the reference position of the readout range set for each frame by the readout phase control unit,
   wherein the readout control unit reads out the pixel data of the frames in accordance with the reference position set by the readout phase control unit and the readout rule set by the readout rule setting unit.

4. The imaging apparatus according to claim 3, further comprising:
   a plurality of frame memories which temporarily store the image data of the frames including the full color data generated by the full color data generator from the read out thinned out pixel data of the frames; and
   an inter-frame computation processing unit which generates new image data by performing computation processing for the image data of the frames stored in the frame memories.

5. The imaging apparatus according to claim 4, wherein the inter-frame computation processing unit performs processing which includes interpolating omitted pixel data with respect to the image data of consecutive frames stored in the frame memories.

6. The imaging apparatus according to claim 3, wherein the readout phase control unit changes the reference position of the readout range for each frame periodically in accordance with a predetermined rule.

7. The imaging apparatus according to claim 3, wherein the readout phase control unit shifts the reference position of the readout range of pixel data read out by the readout control unit such that the image data of consecutive frames do not have omitted pixel data as a whole.

8. The imaging apparatus according to claim 3, wherein the readout phase control unit shifts the reference position of the readout range of pixel data read out by the readout control such that the image data of two consecutive frames do not commonly have omitted pixel data.

9. The imaging apparatus according to claim 3, wherein the weighting coefficients are obtained in accordance with the set readout rule.

10. The imaging apparatus according to claim 1, wherein the weighting coefficients are obtained in accordance with the set readout rule.

* * * * *